United States Patent
Große et al.

(10) Patent No.: US 11,069,074 B2
(45) Date of Patent: Jul. 20, 2021

(54) SYSTEMS AND METHODS FOR IMPROVED 3-D DATA RECONSTRUCTION FROM STEREO-TEMPORAL IMAGE SEQUENCES

(71) Applicant: Cognex Corporation, Natick, MA (US)

(72) Inventors: Marcus Große, Jena (DE); Martin Schaffer, Jena (DE); Simon Willeke, Jena (DE)

(73) Assignee: Cognex Corporation, Natick, MA (US)

( * ) Notice: Subject to any disclaimer, the term of this patent is extended or adjusted under 35 U.S.C. 154(b) by 46 days.

(21) Appl. No.: 16/392,262

(22) Filed: Apr. 23, 2019

(65) Prior Publication Data

US 2019/0325594 A1   Oct. 24, 2019

Related U.S. Application Data

(60) Provisional application No. 62/661,540, filed on Apr. 23, 2018, provisional application No. 62/661,545, (Continued)

(51) Int. Cl.
*G06K 9/00*   (2006.01)
*G06T 7/32*   (2017.01)
(Continued)

(52) U.S. Cl.
CPC .............. *G06T 7/32* (2017.01); *G06K 9/6202* (2013.01); *G06T 1/0014* (2013.01); *G06T 7/521* (2017.01);
(Continued)

(58) Field of Classification Search
CPC .......... G06T 7/32; G06T 7/536; G06T 7/521; G06T 7/90; G06T 7/593; G06T 9/6202; G06T 1/0014
See application file for complete search history.

(56) References Cited

U.S. PATENT DOCUMENTS 5,309,243 A * 5/1994 Tsai ..................... H04N 1/4072
348/221.1
5,661,525 A * 8/1997 Kovacevic ............. H04N 7/012
348/448
(Continued)

FOREIGN PATENT DOCUMENTS

KR  10-2008-0070579 A   7/2008
KR  10-2014-0072724 A   6/2014
(Continued)

OTHER PUBLICATIONS

Stereo Image Quality: Effects of Mixed Spatio-Temporal Resolution, Lew Stelmach et al., IEEE, 1051-8215/00,Mar. 2000, pp. 188-193 (Year: 2000).*
(Continued)

*Primary Examiner* — Jayesh A Patel
(74) *Attorney, Agent, or Firm* — Wolf, Greenfield & Sacks, P.C.

(57) ABSTRACT

In some aspects, the techniques described herein relate to systems, methods, and computer readable media for data pre-processing for stereo-temporal image sequences to improve three-dimensional data reconstruction. In some aspects, the techniques described herein relate to systems, methods, and computer readable media for improved correspondence refinement for image areas affected by over-saturation. In some aspects, the techniques described herein relate to systems, methods, and computer readable media configured to fill missing correspondences to improve three-dimensional (3-D) reconstruction. The techniques include identifying image points without correspondences, using existing correspondences and/or other information to generate approximated correspondences, and cross-checking the approximated correspondences to determine whether the (Continued)

approximated correspondences should be used for the image processing.

17 Claims, 14 Drawing Sheets

Related U.S. Application Data filed on Apr. 23, 2018, provisional application No. 62/661,549, filed on Apr. 23, 2018.

(51) Int. Cl.
| | |
|---|---|
| *G06T 7/593* | (2017.01) |
| *G06T 7/521* | (2017.01) |
| *H04N 13/00* | (2018.01) |
| *G06T 7/90* | (2017.01) |
| *G06T 7/536* | (2017.01) |
| *H04N 13/139* | (2018.01) |
| *H04N 13/122* | (2018.05) |
| *G06K 9/62* | (2006.01) |
| *G06T 1/00* | (2006.01) |

(52) U.S. Cl.
CPC .............. *G06T 7/536* (2017.01); *G06T 7/593* (2017.01); *G06T 7/90* (2017.01); *H04N 13/00* (2013.01); *H04N 13/122* (2018.05); *H04N 13/139* (2018.05); *H04N 2013/0077* (2013.01); *H04N 2013/0081* (2013.01)

(56) References Cited

U.S. PATENT DOCUMENTS

| | | | |
|---|---|---|---|
| 6,295,464 B1 | 9/2001 | Metaxas | |
| 6,690,451 B1 * | 2/2004 | Schubert | G01C 11/06 |
| | | | 356/3.14 |
| 6,718,055 B1 | 4/2004 | Suri | |
| 6,754,370 B1 * | 6/2004 | Hall-Holt | G01B 11/25 |
| | | | 356/3 |
| 7,034,892 B2 * | 4/2006 | Ojo | G06T 5/20 |
| | | | 348/607 |
| 7,254,264 B2 * | 8/2007 | Naske | H04N 13/359 |
| | | | 382/154 |
| 7,260,274 B2 * | 8/2007 | Sawhney | G06T 3/40 |
| | | | 382/284 |
| 7,536,031 B2 * | 5/2009 | Wittebrood | H04N 19/51 |
| | | | 345/475 |
| 7,725,163 B2 * | 5/2010 | Schmitz | A61B 6/4233 |
| | | | 600/425 |
| 7,742,620 B2 * | 6/2010 | Chen | G06K 9/3241 |
| | | | 382/103 |
| 8,172,407 B2 * | 5/2012 | Lim | G06K 9/2036 |
| | | | 353/69 |
| 8,290,248 B2 * | 10/2012 | Yea | G06T 7/593 |
| | | | 382/154 |
| 8,422,795 B2 * | 4/2013 | Pahalawatta | G06T 7/0002 |
| | | | 382/218 |
| 8,583,766 B2 * | 11/2013 | Dixon | H04L 67/42 |
| | | | 709/219 |
| 8,774,559 B2 * | 7/2014 | Segall | H04N 19/587 |
| | | | 382/294 |
| 8,923,604 B2 * | 12/2014 | Kim | H04N 13/128 |
| | | | 382/154 |
| 8,928,813 B2 * | 1/2015 | Liu | H04N 5/213 |
| | | | 348/609 |
| 9,131,216 B2 * | 9/2015 | Argyropoulos | H04N 21/4302 |
| 9,235,920 B2 * | 1/2016 | Girdzijauskas | G06T 9/001 |
| 9,691,140 B2 | 6/2017 | Seshadrinathan et al. | |
| 9,704,232 B2 | 7/2017 | Karam et al. | |
| 9,704,254 B2 * | 7/2017 | Huang | H04N 13/111 |
| 9,754,377 B2 * | 9/2017 | Loghman | G06T 7/593 |
| 9,819,925 B2 | 11/2017 | Posselius et al. | |
| 9,862,093 B2 * | 1/2018 | Bradski | G06T 17/00 |
| 9,886,636 B2 | 2/2018 | Zhang et al. | |
| 10,089,739 B2 * | 10/2018 | Appia | G06K 9/00201 |
| 10,109,104 B2 | 10/2018 | Newman et al. | |
| 10,165,194 B1 * | 12/2018 | Baldwin | G06T 5/50 |
| 10,165,257 B2 | 12/2018 | Seshadrinathan et al. | |
| 10,165,949 B2 * | 1/2019 | Tzvieli | A61B 5/7282 |
| 10,229,481 B2 * | 3/2019 | Manbeck | G06T 5/005 |
| 10,249,052 B2 * | 4/2019 | Cohen | G06T 17/00 |
| 10,257,857 B2 * | 4/2019 | Noh | H04W 72/042 |
| 10,275,857 B2 | 4/2019 | Mirbach et al. | |
| 10,462,447 B1 | 10/2019 | Kohle et al. | |
| 10,516,876 B2 * | 12/2019 | Hicks | G03B 17/54 |
| 10,574,947 B2 * | 2/2020 | Lindner | G06T 7/10 |
| 10,712,561 B2 | 7/2020 | Price et al. | |
| 10,721,456 B2 | 7/2020 | Sasaki | |
| 2004/0151356 A1 * | 8/2004 | Li | G06T 7/0012 |
| | | | 382/131 |
| 2004/0151365 A1 | 8/2004 | An Chang et al. | |
| 2004/0247176 A1 | 12/2004 | Aucsmith et al. | |
| 2005/0074162 A1 * | 4/2005 | Tu | G06T 7/593 |
| | | | 382/154 |
| 2005/0008220 A1 | 6/2005 | Miyazaki | |
| 2005/0271247 A1 * | 12/2005 | Privalov | G06K 9/00711 |
| | | | 382/100 |
| 2007/0041443 A1 | 2/2007 | Ha et al. | |
| 2007/0046924 A1 * | 3/2007 | Chang | G01C 7/00 |
| | | | 356/3.01 |
| 2007/0121998 A1 * | 5/2007 | Stein | G06K 9/4609 |
| | | | 382/103 |
| 2007/0242900 A1 | 10/2007 | Chen et al. | |
| 2007/0285554 A1 * | 12/2007 | Givon | H04N 13/204 |
| | | | 348/340 |
| 2008/0211941 A1 * | 9/2008 | Deever | H04N 5/2353 |
| | | | 348/262 |
| 2009/0010490 A1 * | 1/2009 | Wang | G06T 7/292 |
| | | | 382/103 |
| 2009/0010507 A1 * | 1/2009 | Geng | G06T 7/593 |
| | | | 382/128 |
| 2009/0129666 A1 * | 5/2009 | Goevert | G06T 7/593 |
| | | | 382/154 |
| 2009/0175538 A1 * | 7/2009 | Bronstein | G06F 16/7847 |
| | | | 382/173 |
| 2009/0284529 A1 | 11/2009 | De Aguiar et al. | |
| 2010/0033574 A1 | 2/2010 | Ran et al. | |
| 2010/0194856 A1 * | 8/2010 | Varekamp | H04N 13/261 |
| | | | 348/42 |
| 2011/0043670 A1 * | 2/2011 | Azuma | H04N 5/2355 |
| | | | 348/279 |
| 2011/0080466 A1 * | 4/2011 | Kask | G06T 5/006 |
| | | | 348/43 |
| 2011/0091096 A1 * | 4/2011 | Morris | G03B 19/22 |
| | | | 382/154 |
| 2011/0109723 A1 * | 5/2011 | Ashbey | G06T 11/00 |
| | | | 348/44 |
| 2011/0292044 A1 | 12/2011 | Kim et al. | |
| 2011/0305388 A1 * | 12/2011 | Wedi | G06T 5/005 |
| | | | 382/165 |
| 2011/0311147 A1 * | 12/2011 | Pahalawatta | G06T 7/0002 |
| | | | 382/197 |
| 2012/0050474 A1 | 3/2012 | Segall | |
| 2012/0176478 A1 * | 7/2012 | Wang | G01B 11/2527 |
| | | | 348/47 |
| 2012/0242864 A1 * | 9/2012 | Pauli | G01S 3/784 |
| | | | 348/236 |
| 2012/0287247 A1 | 11/2012 | Stenger et al. | |
| 2012/0294510 A1 * | 11/2012 | Zhang | G06T 7/521 |
| | | | 382/154 |
| 2012/0294530 A1 * | 11/2012 | Bhaskaranand | G06T 7/194 |
| | | | 382/173 |
| 2012/0308114 A1 | 12/2012 | Othmezouri et al. | |
| 2013/0051613 A1 * | 2/2013 | Bobbitt | G06K 9/00771 |
| | | | 382/103 |
| 2013/0127993 A1 | 5/2013 | Wang | |
| 2013/0136299 A1 | 5/2013 | Kim et al. | |
| 2013/0342642 A1 * | 12/2013 | Drazic | H04N 13/122 |
| | | | 348/42 |

(56) References Cited

U.S. PATENT DOCUMENTS

| | | | |
|---|---|---|---|
| 2014/0002441 A1* | 1/2014 | Hung | G06T 7/593 |
| | | | 345/419 |
| 2014/0002617 A1 | 1/2014 | Zhang et al. | |
| 2014/0037146 A1* | 2/2014 | Taguchi | G06T 7/521 |
| | | | 382/107 |
| 2014/0133751 A1* | 5/2014 | Reso | G06T 7/11 |
| | | | 382/167 |
| 2014/0152658 A1 | 6/2014 | Ahn et al. | |
| 2014/0192158 A1* | 7/2014 | Whyte | G06T 7/593 |
| | | | 348/46 |
| 2014/0241612 A1* | 8/2014 | Rhemann | G06T 7/593 |
| | | | 382/154 |
| 2015/0022638 A1 | 1/2015 | Saeki | |
| 2015/0036887 A1* | 2/2015 | Allezard | G06T 7/75 |
| | | | 382/106 |
| 2015/0070471 A1* | 3/2015 | Loce | G06K 9/00785 |
| | | | 348/47 |
| 2015/0172623 A1 | 6/2015 | Wu et al. | |
| 2015/0178585 A1* | 6/2015 | Karafin | G06T 3/0087 |
| | | | 382/197 |
| 2015/0243044 A1* | 8/2015 | Luo | G06T 7/246 |
| | | | 382/107 |
| 2016/0111129 A1 | 4/2016 | Crivelli et al. | |
| 2016/0343146 A1 | 11/2016 | Brown et al. | |
| 2017/0171525 A1* | 6/2017 | Koehle | H04N 13/204 |
| 2017/0178363 A1 | 6/2017 | Venkataraman et al. | |
| 2017/0180722 A1* | 6/2017 | Manbeck | G06T 5/005 |
| 2018/0075294 A1 | 3/2018 | Shahar et al. | |
| 2018/0137389 A1* | 5/2018 | Mathieu | G06K 9/00718 |
| 2018/0253683 A1 | 9/2018 | Taylor et al. | |
| 2018/0253863 A1 | 9/2018 | Wallack et al. | |
| 2018/0306577 A1* | 10/2018 | Taubin | G01B 11/2536 |
| 2019/0088004 A1 | 3/2019 | Lucas et al. | |
| 2019/0128665 A1* | 5/2019 | Harendt | G06T 7/40 |
| 2019/0147599 A1* | 5/2019 | Smits | G06T 7/20 |
| | | | 382/107 |
| 2019/0236796 A1 | 8/2019 | Blasco Claret et al. | |
| 2019/0318455 A1 | 10/2019 | Gruen et al. | |
| 2019/0325590 A1 | 10/2019 | Große | |
| 2019/0325598 A1 | 10/2019 | Große | |
| 2020/0167938 A1* | 5/2020 | Matzner | G06K 9/00342 |

FOREIGN PATENT DOCUMENTS

| | | | | |
|---|---|---|---|---|
| KR | 10-2016-0136665 A | | 11/2016 | |
| WO | WO 2011/083555 A1 | | 7/2011 | |
| WO | WO-2011083555 A1 | * | 7/2011 | ........... G06T 3/4061 |
| WO | WO 2017/220598 A1 | | 12/2017 | |
| WO | WO-2017220598 A1 | * | 12/2017 | ............. G06T 7/579 |

OTHER PUBLICATIONS

Temporal Consistent Fast Stereo Matching for Advanced Driver Assistance Systems (ADAS), Mohamed al Ansari et al., 978-1-4244-7868-2, IEEE, Jun. 21-24, 2010, pp. 825-831 (Year: 2010).*

Spatiotemporal Stereo and Scene Flow via Stequel Matching, Mikhail Sizintsevetal., 0162-8828, IEEE, Jun. 2012, pp. 1206-1219 (Year: 2012).*

Criminisi et al., Efficient dense stereo with occlusions for new view-synthesis by four-state dynamic programming. International Journal of Computer Vision. Jan. 1, 2007;71(1):89-110.

El Jaafari et al., Fast spatio-temporal stereo matching for advanced driver assistance systems. Neurocomputing. Jun. 19, 2016;194:24-33.

Long et al., Accurate identification of saturated pixels for high dynamic range measurement. Optical Engineering. Apr. 2015;54(4):043106-1.

Zhang et al., Improved temporal correspondences in stereo-vision by Ransac. IEEE Proceedings of the 17th International Conference on Pattern Recognition ICPR. Aug. 26, 2004;4:52-55.

* cited by examiner

SYSTEMS AND METHODS FOR IMPROVED 3-D DATA RECONSTRUCTION FROM STEREO-TEMPORAL IMAGE SEQUENCES

CROSS REFERENCE TO RELATED APPLICATIONS

This application claims the benefit under 35 U.S.C. § 119(e) of: U.S. Provisional Patent Application Ser. No. 62/661,540, filed Apr. 23, 2018 and entitled "METHODS AND APPARATUS FOR DATA PRE-PROCESSING FOR STEREO-TEMPORAL IMAGE SEQUENCES TO IMPROVE 3-D DATA RECONSTRUCTION;" U.S. Provisional Patent Application Ser. No. 62/661,545, filed Apr. 23, 2018 and entitled "METHODS AND APPARATUS FOR CORRESPONDENCE REFINEMENT;" and U.S. Provisional Patent Application Ser. No. 62/661,549, filed Apr. 23, 2018 and entitled "METHODS AND APPARATUS FOR FILLING MISSING CORRESPONDENCE FOR THREE-DIMENSIONAL RECONSTRUCTION," each of which are hereby incorporated herein by reference in their entirety.

TECHNICAL FIELD

The techniques described herein relate generally to three-dimensional (3-D) reconstruction from two-dimensional images.

BACKGROUND

The use of advanced machine vision systems and their underlying software is increasingly employed in a variety of manufacturing and quality control processes. Machine vision enables quicker, more accurate and repeatable results to be obtained in the production of both mass-produced and custom products. Typical machine vision systems include one or more cameras directed at an area of interest, a frame grabber/image processing elements that capture and transmit images, a computer or onboard processing device, and a user interface for running the machine vision software application and manipulating the captured images, and appropriate illumination on the area of interest.

One form of 3-D vision system is based upon stereo cameras employing at least two cameras arranged in a side-by-side relationship with a baseline of one-to-several inches therebetween. Stereo-vision based systems in general are based on epipolar geometry and image rectification. They may use correlation based methods or combining with relaxation techniques to find the correspondence in rectified images from two or more cameras. However, conventional stereo vision systems are limited in their ability to create accurate three-dimensional data reconstructions of objects.

SUMMARY

In some aspects, systems, methods, and computer readable media are provided for data pre-processing for stereo-temporal image sequences to improve three-dimensional data reconstruction. The inventors have recognized that, while conventional systems are known to apply noise reduction to two-dimensional images, none of these systems are capable of using an independent image point-wise noise reduction for temporal image sequences. The inventors note that the described systems and methods are particularly novel in deriving local noise reduction criterion and noise reduction strength based on temporal information. The inventors have developed techniques, as discussed further herein, that improve three-dimensional data reconstruction by pre-processing data for stereo-temporal image sequences.

In some embodiments, the described systems and methods provide for a system for establishing stereo correspondence between two images. The system may include two or more cameras arranged to capture images of a scene in a manner consistent to produce stereo image correspondence. Alternatively, the system may include one or more cameras with one or more inverse cameras (or projectors) arranged to capture images of a scene in a manner consistent to produce pairwise stereo image correspondences. A series of light patterns may be projected on the scene. The series of light patterns may be created by one or more projectors. A set of images may be captured from each camera. Each image capture may correspond to one of the series of projected light patterns. A temporal pixel image, which is comprised of an ordered set of images captured from a camera or a sensor, and a modified temporal pixel image may be determined for each camera. An epipolar line search may be used to determine correspondence between modified temporal pixels from each sensor. A temporal pixel at position x,y in a temporal pixel image is comprised of an ordered set of pixel values gathered at position x,y, from the set of images captured from each sensor. A modified temporal pixel at position x,y in a modified temporal pixel image is determined by comparing each set value in a temporal pixel at location x,y to one or more thresholds, and replacing the set value with another value based on the temporal pixel set values and/or spatially neighboring temporal pixel set values, based on the one or more thresholds. Correspondences may be searched by using only the modified temporal image or using the modified temporal and normal temporal image.

In some aspects, systems, methods, and computer readable media are provided for improved correspondence refinement for image areas affected by imaging artifacts, such as oversaturation. The inventors have recognized that conventional systems do not employ gray-valued (e.g., continuous) temporal illumination sequences and try to take a subset of (e.g., mask) the information to improve correspondence quality for oversaturated image points. For example, in phase-shifting schemes, it is difficult to employ such an approach as the phase value calculation is in need of a fixed phase-step between successive temporal values. Thus masking certain temporal instances may break the phase value calculation or require adapting the chosen phase function on a point per point basis. The inventors have developed techniques, as discussed further herein, that that provide for better 3-D data reconstruction by improving correspondence refinement for image areas affected by oversaturation.

In some aspects, systems, methods, and computer readable media are provided for completing missing correspondences for 3-D reconstruction. The inventors have recognized that conventional systems may not determine correspondences for one or more image points. The inventors have developed techniques that can leverage other correspondences and/or data to determine approximated correspondences for the one or more image points. The techniques add robustness by cross-checking the approximated correspondences. The cross-check can, for example, be used to ensure that approximated correspondences are accepted as valid where the system can determine reason(s) why a correspondence was not found using other correspondence searches (e.g., because of oversaturation, low-modulation, object texture, inter-scene reflection, etc., which can cause correspondence searches to be unable to determine an initial correspondence). As another example, by choosing a specific or multiple-specific cross-check(s), the techniques can be configured to validate approximated correspondences that are meaningful to a particular scene.

In some embodiments, the described systems and methods provide for a system for establishing stereo correspondence between two images. The system may include two or more cameras arranged to capture images of a scene in a manner consistent to produce stereo image correspondence. Alternatively, the system may include one or more cameras with one or more inverse cameras (or projectors) arranged to capture images of a scene in a manner consistent to produce pairwise stereo image correspondences. A series of light patterns may be projected on the scene. The series of light patterns may be created by one or more projectors. A set of images may be captured from each camera. Each image capture may correspond to one of the series of projected light patterns. Correspondences may be searched for image points in the sets of images captured by each camera. Approximated correspondences can be calculated for image points without correspondences. Each of the approximated correspondences can be cross-checked to determine whether to store the approximated correspondences as valid correspondences.

In some aspects, systems, methods, and computer readable media are provided for pre-processing a temporal pixel image. The system may comprise a processor in communication with memory, the processor being configured to execute instructions stored in memory that cause the processor to: obtain a set of images of a scene, wherein each image in the set of images (a) captures a portion of a light pattern projected onto the scene and (b) is of a perspective of the scene; generate, based on the set of images, a first temporal pixel image comprising a set of temporal pixels, wherein each temporal pixel in the set of temporal pixels comprises a set of pixel values at an associated position from each image of the set of images; and generate, based on the first temporal pixel image, a first modified temporal pixel image, comprising modifying a first temporal pixel from the set of temporal pixels, comprising: comparing the first temporal pixel to a metric; and based on the comparison, replacing one or more pixel values of the first temporal pixel with another value determined based on the first temporal pixel and/or one or more temporal pixels spatially proximate to the first temporal pixel.

In some aspects, systems, methods, and computer readable media are provided for determining saturation data for a temporal pixel image. The system may comprise a processor in communication with memory, the processor being configured to execute instructions stored in memory that cause the processor to: obtain a set of images of a scene, wherein each image in the set of images (a) captures a portion of a light pattern projected onto the scene and (b) is of a perspective of the scene; generate, based on the set of images, a first temporal pixel image comprising a set of temporal pixels, wherein each temporal pixel in the set of temporal pixels comprises a set of pixel values at an associated position from each image of the set of images; and generate, for a first temporal pixel from the set of temporal pixels, saturation data comprising a set of saturation values, wherein: each saturation value of the set of saturation values is associated with a pixel value of the set of pixel values of the first temporal pixel; and each pixel value is compared to a metric to determine a corresponding saturation value.

In some aspects, systems, methods, and computer readable media are provided for determining stereo correspondence between a first set of images and a second set of images. The system may comprise a processor in communication with memory, the processor being configured to execute instructions stored in memory that cause the processor to: obtain a first set of images of a scene, wherein each image in the first set of images (a) captures a portion of a light pattern projected onto the scene and (b) is of a perspective of the scene; generate, based on the first set of images, a first temporal pixel image comprising a set of temporal pixels, wherein each temporal pixel in the set of temporal pixels comprises a set of pixel values at an associated position from each image of the first set of images; and determine a set of correspondences between image points of the first set of images and image points of a second set of images of the scene, wherein the second set of images is captured from a different perspective than the first set of images, comprising: determining that a first temporal pixel in the first temporal pixel image is lacking a correspondence to a temporal pixel in a second temporal pixel image determined based on the second set of images; generating, for the first temporal pixel, an approximate correspondence to a second temporal pixel in the second temporal pixel image, based on one or more existing correspondences, wherein each existing correspondence of the one or more existing correspondences: is between a temporal pixel in the first temporal pixel image and a temporal pixel in the second temporal pixel image; and satisfies a relation metric with respect to the first temporal pixel.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

The techniques described herein relate generally to three-dimensional (3-D) reconstruction from two-dimensional images. The 3-D reconstruction may be performed using a system for establishing stereo correspondences between images in order to create 3D shape representations of objects. Images acquired during such a 3D shape acquisition can have varying quality depending on the optical properties of the object(s) and hence impact the 3D data quality. Several physical properties may influence the visual appearance to the system's cameras depending on how the object redirects light. For example, one or more objects with strong light absorption characteristics may be dark in images. In another example, one or more objects with strong Lambertian scattering characteristics may appear bright in images. In yet another example, one or more objects with low Lambertian but strong directional scattering (including specular reflection) characteristics may appear bright in images from one camera but dark in images from another camera having a different perspective.

Figure 1:
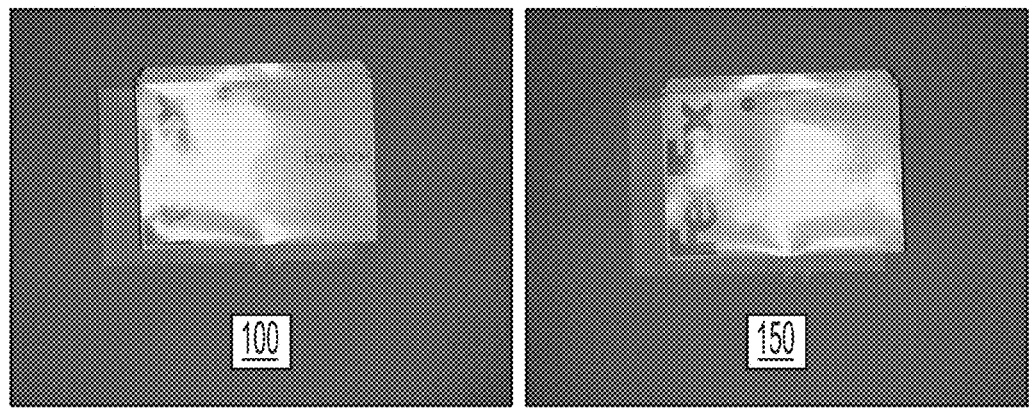
FIG. 1 shows an exemplary embodiment where certain image points exhibit varying quality depending on the optical properties of the object in presence of two cameras, according to some embodiments.

If several objects having different characteristics are combined in a scene, the situation can get worse, as some regions of the images may appear bright (e.g., overexposed), dark (e.g., underexposed), and/or having different intensities to the system's different cameras. FIG. 1 shows a pair of images of objects 100, 150 exhibiting such characteristics, including overexposed areas, underexposed areas, and areas that differ between the views of the two cameras.

In some embodiments, the system may determine stereo correspondences, without special treatment of such areas, by: (1) an initial correspondence-search leading to rough estimates of potential correspondences, where a normalized-cross-correlation between temporal sequences of potential correspondences is used to check for similarity; (2) a refinement step, that uses sub-pixel interpolated gray values, to more precisely locate correspondences based on the potential correspondences from the first step, where a normalized-cross-correlation between temporal sequences of potential correspondences is used to check for similarity; and (3) all found and established stereo correspondences that surpassed a certain metric, e.g., a similarity threshold, are triangulated to calculate a 3D point per correspondence, where the whole set of points may be referred to as 3D data. For all image points where the correlation was below the threshold, 3D data may be missing. This may be caused by the above mentioned detrimental circumstances.

Figure 3:
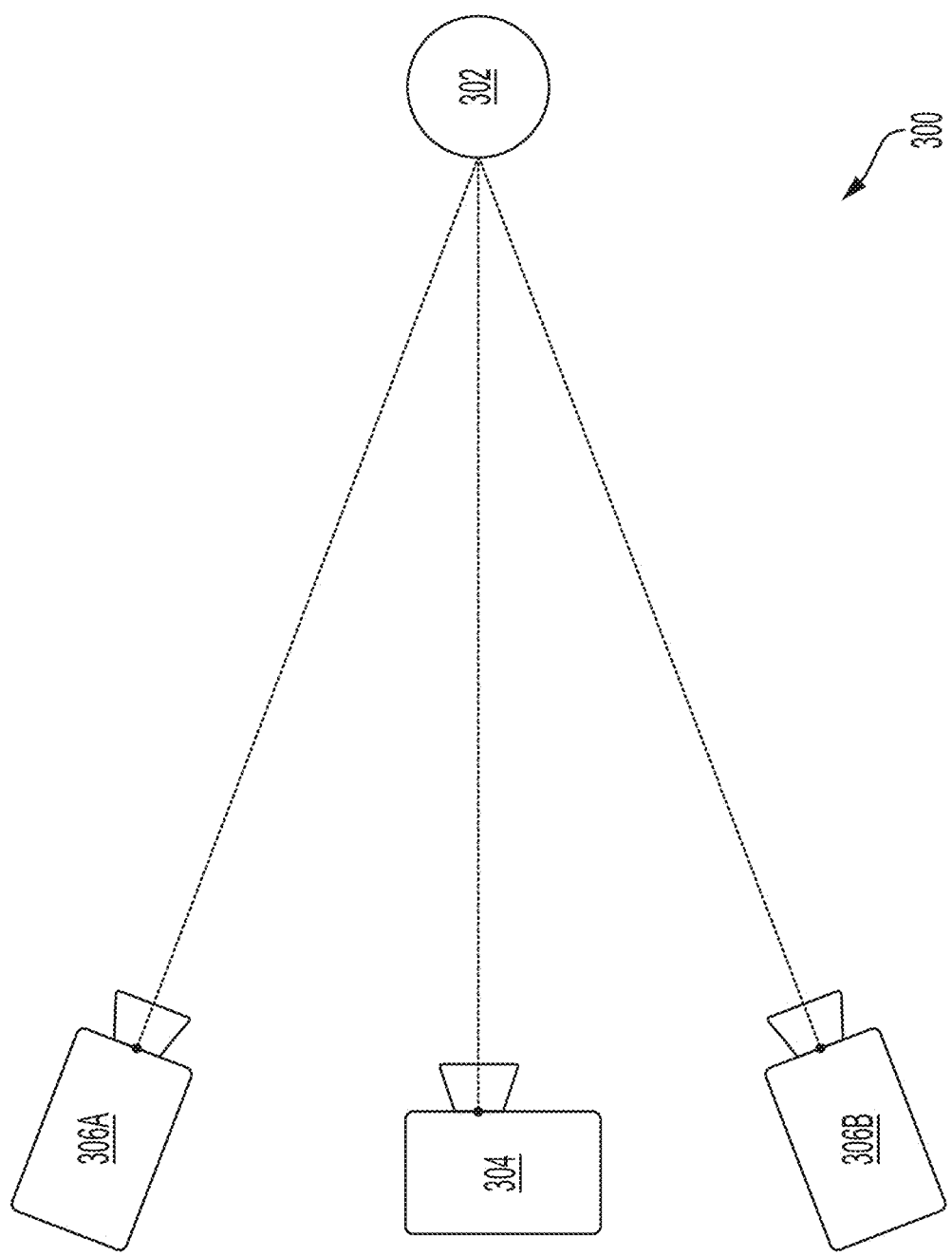
FIG. 3 shows an illustrative embodiment where a projector and two cameras are arranged to capture images of a scene in a manner consistent to produce stereo image correspondence, according to some embodiments.

In some aspects, the described systems and methods employ a statistical pattern projector in order to temporally code image sequences of an object captured using multiple cameras. FIG. 3 shows an illustrative embodiment 300 where a projector 304 and two cameras 306A, 306B are arranged to capture images of an object or scene 302 in a manner consistent to produce stereo image correspondence. For example, the projector may project a translating pattern on the object, and each camera may capture an image sequence including 12-16 images (or some other number of images) of the object. Each image comprises a set of pixels that make up the image. In some embodiments, the light pattern may shift in horizontal and/or vertical directions such that the pattern rotates over the object or scene (e.g., without the pattern itself rotating clockwise or counter-clockwise). Each of the cameras 306A, 306B can include a charge-coupled device (CCD) image sensor, a complementary metal-oxide semiconductor (CMOS) image sensor, or another suitable image sensor. In some embodiments, each of the cameras 306A, 306B can have a rolling shutter, a global shutter, or another suitable shutter type. In some embodiments, each of the cameras 306A, 306B can have a GigE Vision interface, a Universal Serial Bus (USB) interface, a coaxial interface, a FIREWIRE interface, or another suitable interface. In some embodiments, each of the cameras 306A, 306B can have one or more smart functions. In some embodiments, each of the cameras 306A, 306B can have a C-mount lens, an F-mount lens, an S-mount lens, or another suitable lens type. In some embodiments, each of the cameras 306A, 306B can have a spectral filter adapted to a projector, e.g., projector 304, to block environmental light outside the spectral range of the projector.

Figure 2:
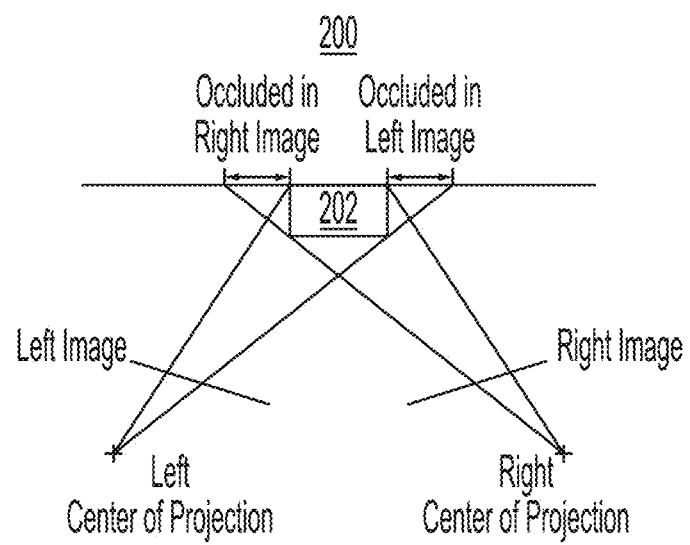
FIG. 2 shows an exemplary embodiment where certain image points are occluded due to their presence in non-overlapping fields of view of two cameras, according to some embodiments.

In some embodiments, in order to reconstruct three-dimensional data from stereo image sequences from two cameras, corresponding pairs of image points (or pixels) may need to be found between the images from each camera. However, in some instances, an image point in one image may not have a corresponding point in the other image. This may occur due to occlusion of image points residing in non-overlapping fields of view of the two cameras, over-saturation of image points in one or both images, or another suitable factor leading to occlusion or obscurement of image points in one or both images. For example, FIG. 2 shows an exemplary embodiment 200 where certain image points are occluded due to their presence in non-overlapping fields of view of the two cameras capturing images of an object 202. In such instances, a normalized cross-correlation algorithm using the temporal images or only a subset of the temporal images may be applied to the two image sequences in order to determine the corresponding pairs of pixels from each image (e.g., that have similar temporal gray values).

Figure 4:
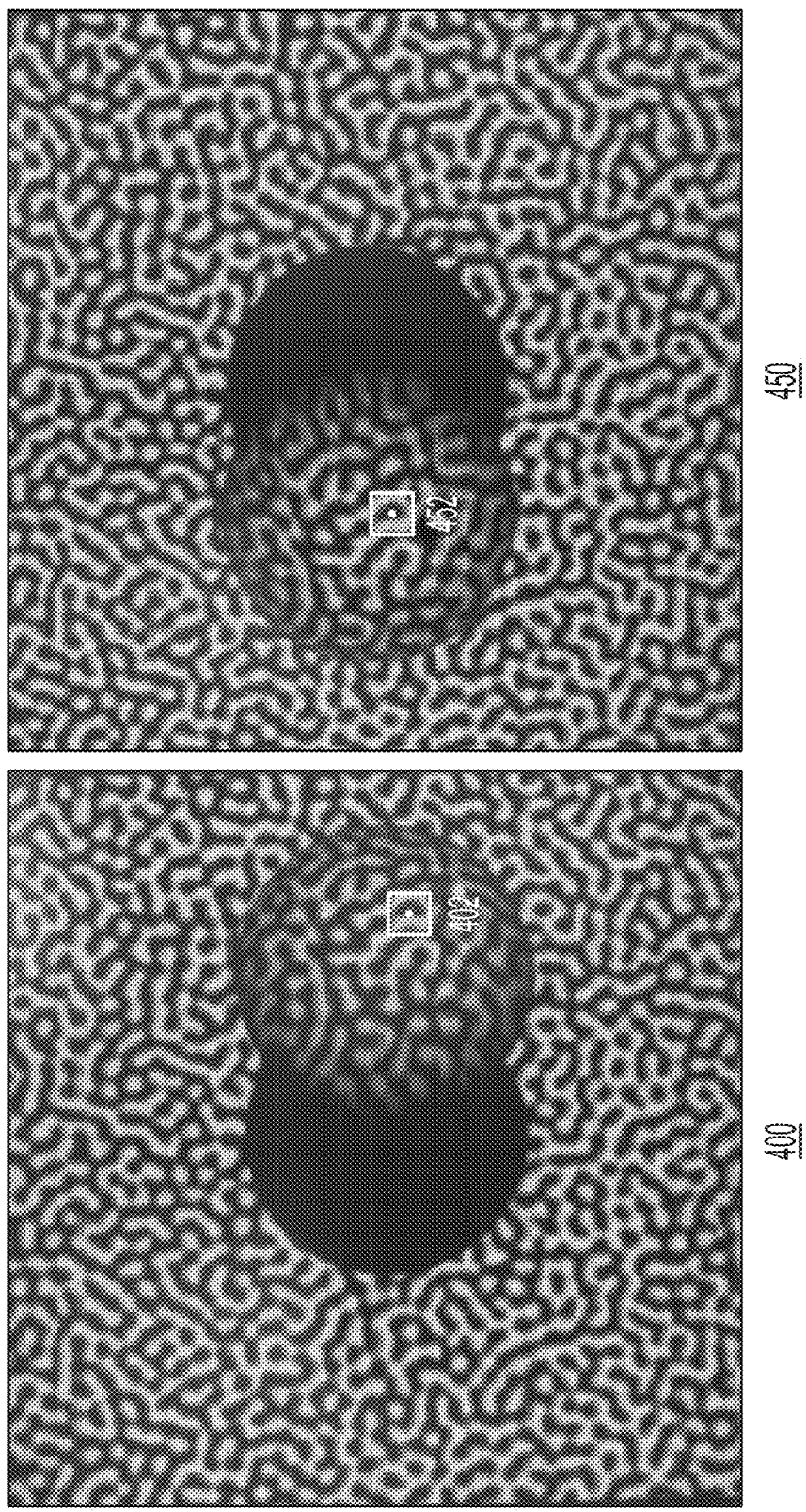
FIG. 4 shows an exemplary embodiment of temporal correlation, including a pair of stereo images corresponding to one of a series of projected light patterns, according to some embodiments.

FIG. 4 shows an exemplary pair of stereo images 400 and 450 corresponding to one of a series of projected light patterns. For example, the projector 304 may project a light pattern on the object, and the cameras 306A, 306B may capture the stereo images 400 and 450. In some embodiments, in order to reconstruct three-dimensional data from stereo image sequences from two cameras, corresponding pairs of pixels, such as pixels 402 and 452, may need to be found between the images from each camera.

Figure 5:
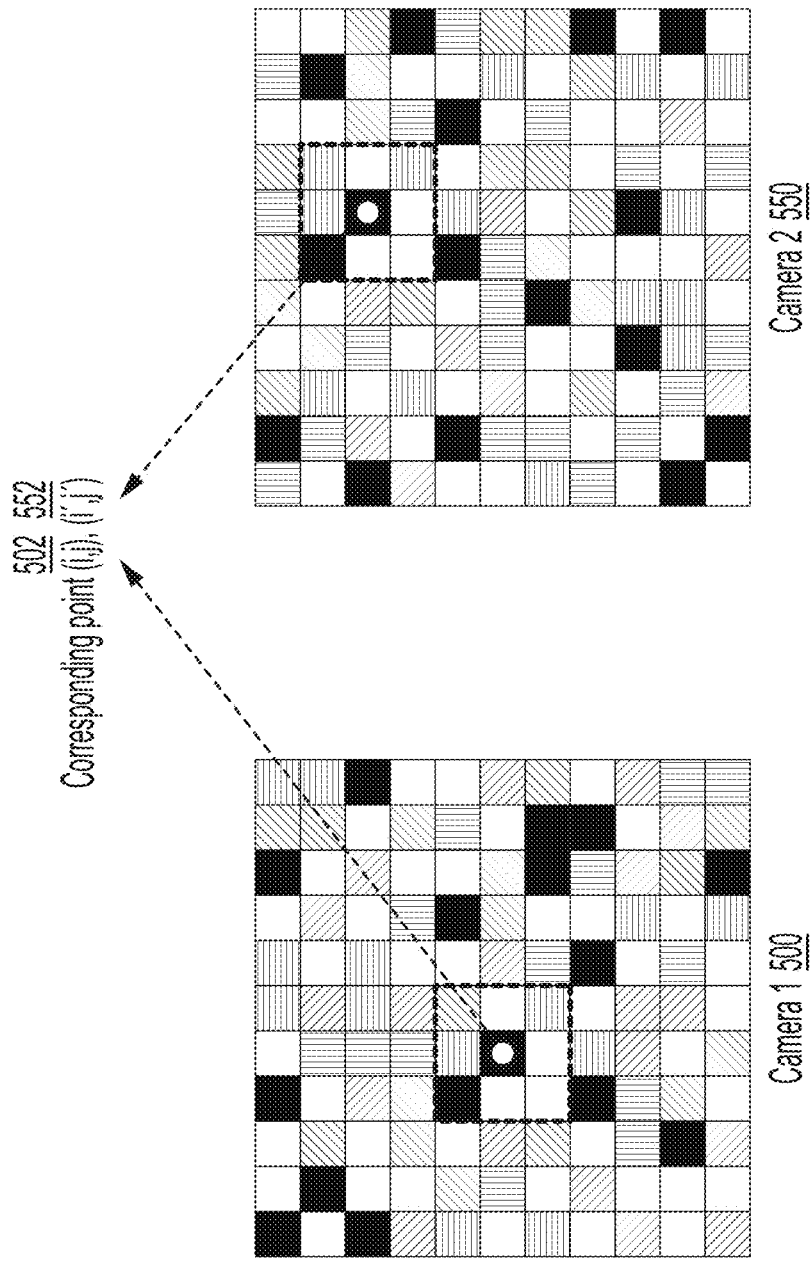
FIG. 5 shows an illustrative pair of stereo images of a scene, according to some embodiments.
Figure 6:
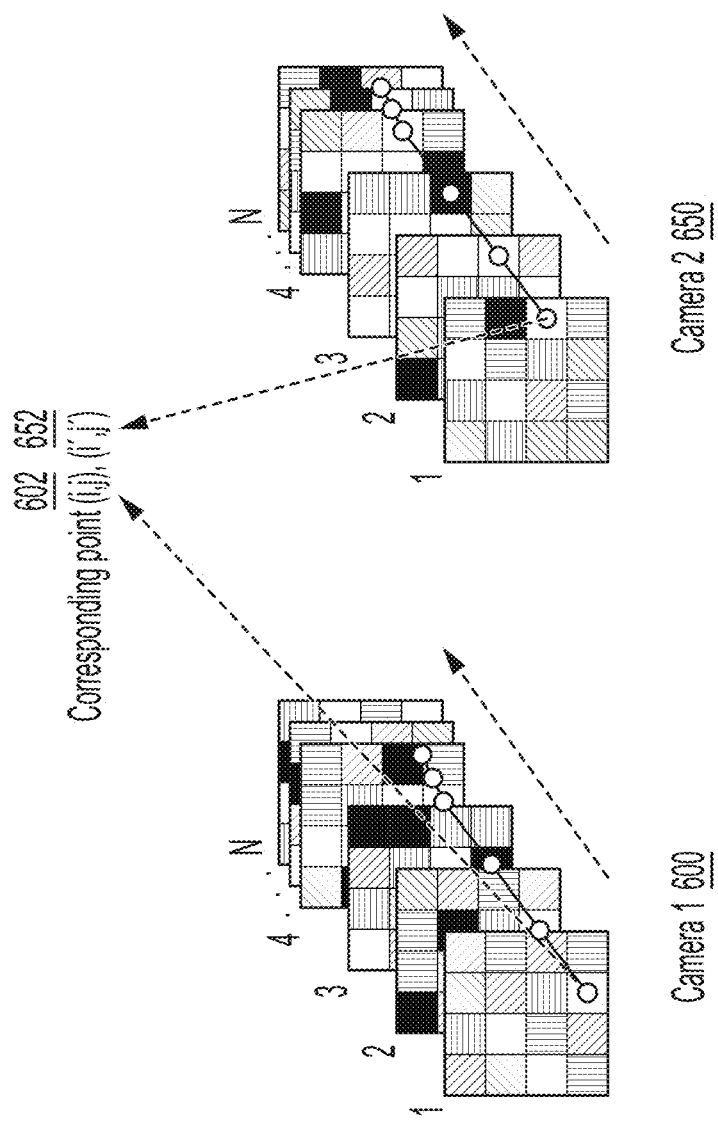
FIG. 6 shows an illustrative pair of stereo-temporal image sequences corresponding to a series of light patterns projected on a scene, according to some embodiments.

FIG. 5 shows an illustrative pair of stereo images 500 and 550 (and associated pixels) with corresponding pixels 502 and 552, which represent the same portion of the pattern projected in the two images 500 and 550. For example, as discussed above, the projector 304 may project a light pattern on the scene, and the cameras 306A, 306B may capture the stereo images 500 and 550. The captured stereo images 500 and 550 can be used to identify correspondences across the two pixels. In some embodiments, sequences of stereo images captured over time are used to identify correspondences. Following from the single pair of stereo images shown in FIG. 5, FIG. 6 shows, when the projector 304 successively projects different light patterns on the scene over time, the cameras 306A, 306B may capture the stereo-temporal image sequences 600 and 650 with corresponding temporal pixels 602 and 652. Each of cameras 306A, 306B may capture a sequences of images 1, 2, 3, 4, . . . N over time. Temporal pixels 602 and 652 are based on the pixels (i,j) and (i',j') across the stereo-temporal image sequences 600 and 650, respectively. Over time, each temporal pixel includes an ordered list of gray values: G_i_j_t where t indicates the discrete temporal instances 1, 2, 3, 4, . . . N.

In some embodiments, a normalized cross-correlation algorithm using the temporal images or only a subset of the temporal images may be applied to the two image sequences in order to determine the corresponding pairs of pixels from each image (e.g., that have similar temporal gray values). However, such a process may require great computational effort to perform the necessary calculations. This process may be improved by efficiently processing data of initial correspondence assignments. In some embodiments, for each pixel of the first camera, the potentially corresponding pixels are retrieved by performing a normalized cross-correlation with all feasible candidates along the epipolar line in the second camera with a threshold to compensate for deviation due to calibration of the cameras, e.g., +/−one pixel or another suitable value. In one example, this approximates to calculating a normalized cross correlation for 3000 potential pairs which amounts to approximately $x_{res} \times y_{res} \times N \times 3000$ multiplications for N number of images of dimension $x_{res}$ by $y_{res}$ (e.g., approximately $94 \times 10^9$ for N=24).

In some aspects, the described systems and methods perform a correspondence assignment between image points in a subset or all paired images from the stereo image sequences in two steps. First, an initial correspondence search is performed to derive rough estimates of potential correspondences between image points in a subset or all paired images from the stereo image sequences. The initial correspondence search is performed using temporal pixel values and therefore is accurate to the pixel level. Second, a correspondence refinement step is performed to locate more precise correspondences between image points in a subset or all paired images from the stereo image sequences, based on the potential correspondences derived from the first step. The correspondence refinement is performed by interpolating gray values in a subset of or all of the paired images from the stereo image sequences that are near the initial image points derived in the initial correspondence search. The correspondence refinement is performed using sub-pixel values and therefore is more accurate than the pixel level analysis in the first step. In one or both steps, the normalized cross-correlation algorithm discussed above may be applied to derive the potential and/or precise correspondences between image points in the two images under analysis. Related description, including further details, may be found in commonly-owned PCT Publication No. WO2017220598A1, the entirety of which is incorporated herein by reference.

In some embodiments, two cameras are used to capture stereo image sequences of the object where, after image acquisition, each image sequence includes 12-16 images of the object. In order to perform the correspondence assignment on the stereo image sequences from two cameras, the two steps described above may be performed. For the first step, the initial correspondence search may be performed to correlate each image point of the first image sequence to a corresponding image point of the second image sequence to find the image points with the highest correlation. In an example where each image-sequence includes 16 images, the correlation is performed by using the 16 temporal gray values of each image point as the correlation-"window" and correlating suitable pairs of image points from camera 1 and camera 2. At the end of the first step, the derived rough estimates provide potential candidates of potential correspondences, which are accurate to the pixel-level since the search was performed using the pixel values. For the second step, the correspondence refinement may be performed to derive more precise correspondences from the potential correspondences at sub-pixel accuracy. In the example where each image sequence includes 16 images, based on the gray value sequence for each pixel across the images in the first image sequence, the correspondence refinement process interpolates gray values in a subset or all of the paired images from the second image sequence that are near the initial image point derived in the first step. In this example, performing the correspondence refinement may include interpolating the gray values 16 times in the images from the second image sequence at a given subpixel-position. The correlation can be conducted on the temporal window of the image point of camera 1 and the interpolated temporal window at a subpixel-position of camera 2.

In some embodiments, in order to address the low quality of 3D data affected by exhibiting different characteristics, including overexposed areas, underexposed areas, and areas that differ between the views of the two cameras, the inventors have proposed the below described techniques, e.g., in order to address underexposed image areas, overexposed image areas, and/or image points having missing 3D data.

In some aspects, the techniques discussed herein can be used for data pre-processing for stereo-temporal image sequences to improve three-dimensional data reconstruction. The inventors have recognized that, while conventional systems are known to apply noise reduction to two-dimensional images, none of these systems are capable of using an independent image point-wise noise reduction for temporal image sequences. The inventors note that the described systems and methods are particularly novel in deriving local noise reduction criterion and noise reduction strength based on temporal information. The inventors have developed techniques, as discussed further herein, that improve three-dimensional data reconstruction by pre-processing data for stereo-temporal image sequences.

In some aspects, where image noise (e.g., coming from imagers) may significantly affect the data, the correlation level may be reduced and systematic errors may appear in the reconstructed three-dimensional data. This may be due to poorly modulated points, high imager noise (in some embodiments, even for well-modulated image points), or a combination thereof. The described systems and methods address two issues, increasing the correlation level of correspondences, and removing systematic errors in the three-dimensional reconstruction. The inventors have successfully tested this approach with a CPU and a GPU implementation on numerous datasets.

The described systems and methods reduce noise in a meaningful manner to the correspondence assignment algorithm of temporal image sequences. Two distinct applications of the described systems and methods are described below. Initially, the described systems and methods acquire stereo image sequences, which are then processed.

In some aspects, the described systems and methods provide for pre-processing stereo image sequences to enhance initial correspondence search. In some embodiments, a copy of the original sequences is created.

Figure 9:
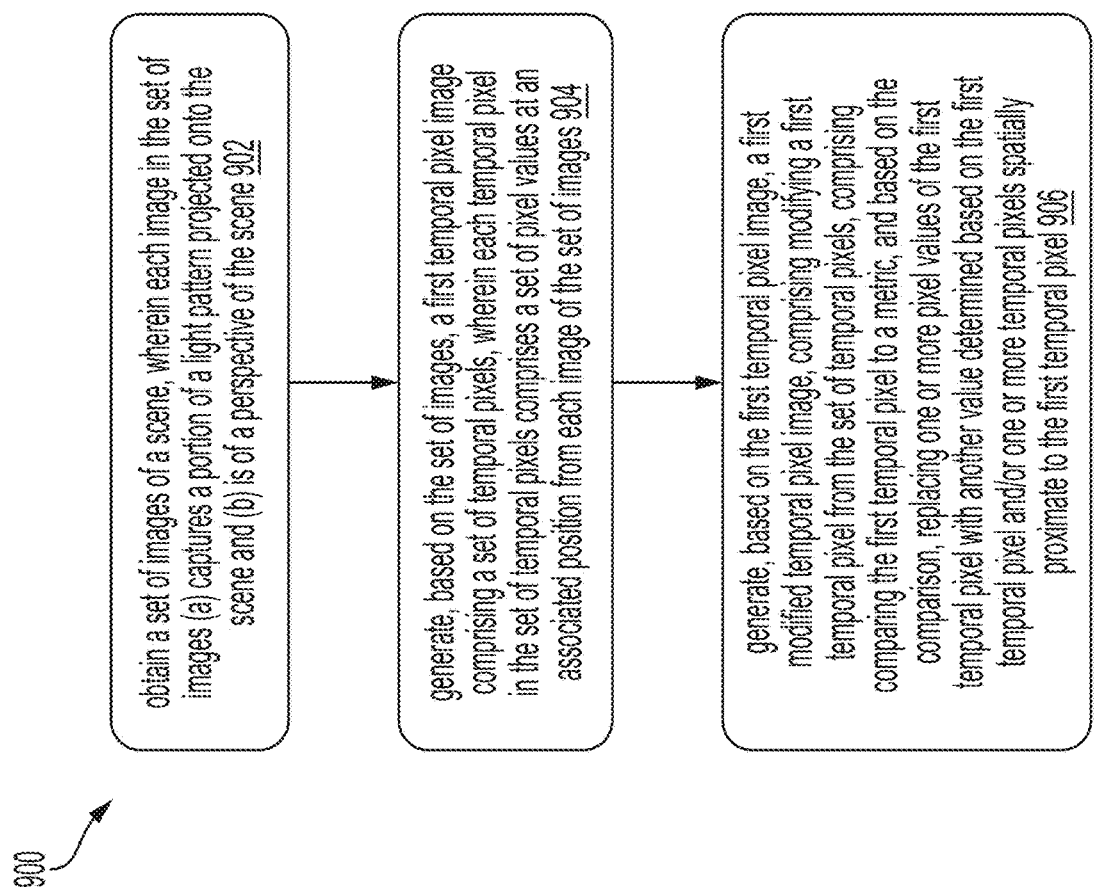
FIG. 9 shows an exemplary computerized method for pre-processing a temporal pixel image, according to some embodiments.

FIG. 9 shows an exemplary computerized method 900 for pre-processing a temporal pixel image, according to some embodiments. A system for pre-processing a temporal pixel image may comprise a processor in communication with memory. The processor may be configured to execute instructions stored in memory that cause the processor to perform the computerized method.

At 902, the system may obtain a set of images of a scene. Each image in the set of images may (a) capture a portion of a light pattern projected onto the scene and (b) be of a perspective of the scene.

At 904, the system may generate, based on the set of images, a first temporal pixel image comprising a set of temporal pixels. Each temporal pixel in the set of temporal pixels may comprise a set of pixel values at an associated position from each image of the set of images.

At 906, the system may generate, based on the first temporal pixel image, a first modified temporal pixel image. The system may generate the first modified temporal pixel image by modifying a first temporal pixel from the set of temporal pixels. The system may modify the first temporal pixel by comparing the first temporal pixel to a metric and, based on the comparison, replacing one or more pixel values of the first temporal pixel with another value determined based on the first temporal pixel and/or one or more temporal pixels spatially proximate to the first temporal pixel, e.g., a pixel value derived from a Gaussian smoothing of the first temporal pixel and/or one or more temporal pixels in a spatial neighborhood of the first temporal pixel. For example, the pixel value may be derived using a Gaussian filter with a kernel size 3×3 that is applied to the first temporal pixel and eight temporal pixels in a spatial neighborhood of the first temporal pixel.

In some embodiments, one or more metrics may be used. For example, the metric, e.g., a threshold, may relate to a degree of underexposure in the set of images. In some embodiments, comparing the first temporal pixel to the metric may comprise comparing whether a maximum of pixel values in the first temporal pixel is below the metric, e.g., a threshold such as MAX_THRESHOLD, described with respect to FIG. 10 below. In some embodiments, comparing the first temporal pixel to the metric comprises comparing whether each pixel value in the first temporal pixel is below the metric, e.g., a threshold such as INDIVIDUAL_THRESHOLD, described with respect to FIG. 11 below. In some embodiments, another applicable metric may be the range of the values, i.e., the difference between a maximum pixel and a minimum pixel value, or modulation, or alternatively the root mean square deviation of the set of pixel values of the temporal pixel.

In some embodiments, the system may determine a stereo correspondence between the set of images and a second set of images captured from a different perspective than the perspective of the set of images. The system may determine the stereo correspondence based on the first modified temporal pixel image and a second modified temporal pixel image determined based on the second set of images.

Figure 10:
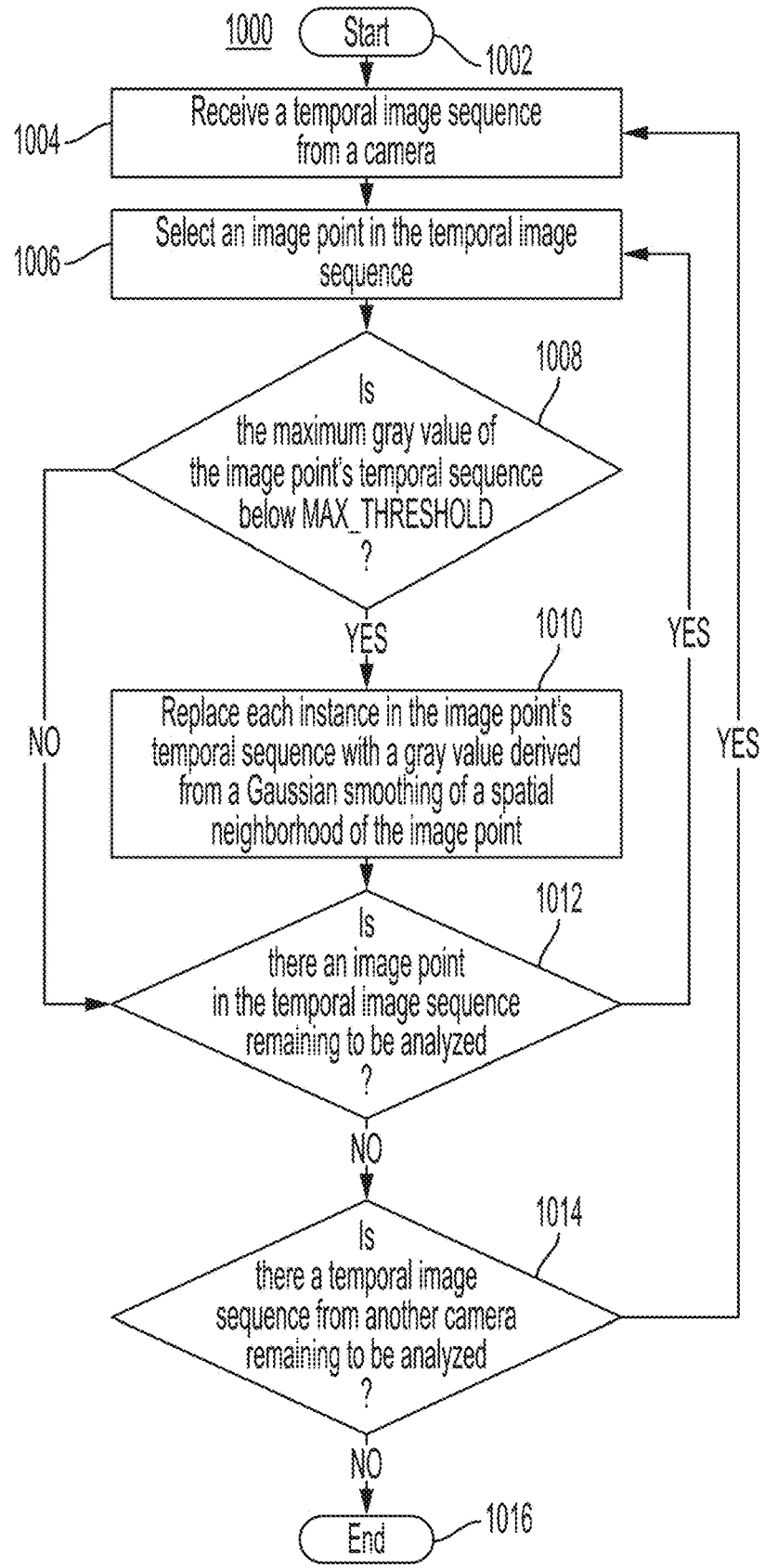
FIG. 10 shows an exemplary computerized method for pre-processing data for stereo-temporal image sequences, according to some embodiments.

In some embodiments, for a given image point of each camera, it is checked whether the maximum gray value of the whole temporal sequence is below a metric, e.g., a threshold. For exemplary purposes, the examples that follow use MAX_THRESHOLD to refer to this threshold. The MAX_THRESHOLD may be a user-specified threshold, a camera-specific threshold, or another suitable threshold. If so, each temporal gray value instance of this image point in the sequence is replaced by the gray value derived from a smoothing of the respective spatial neighborhood of this image point. The smoothing can be, for example, a Gaussian smoothing, a bilateral filter, and/or other filtering. The initial correspondence search is conducted on these modified image sequences. FIG. 10 and related description provides more detail on this process.

Figure 11:
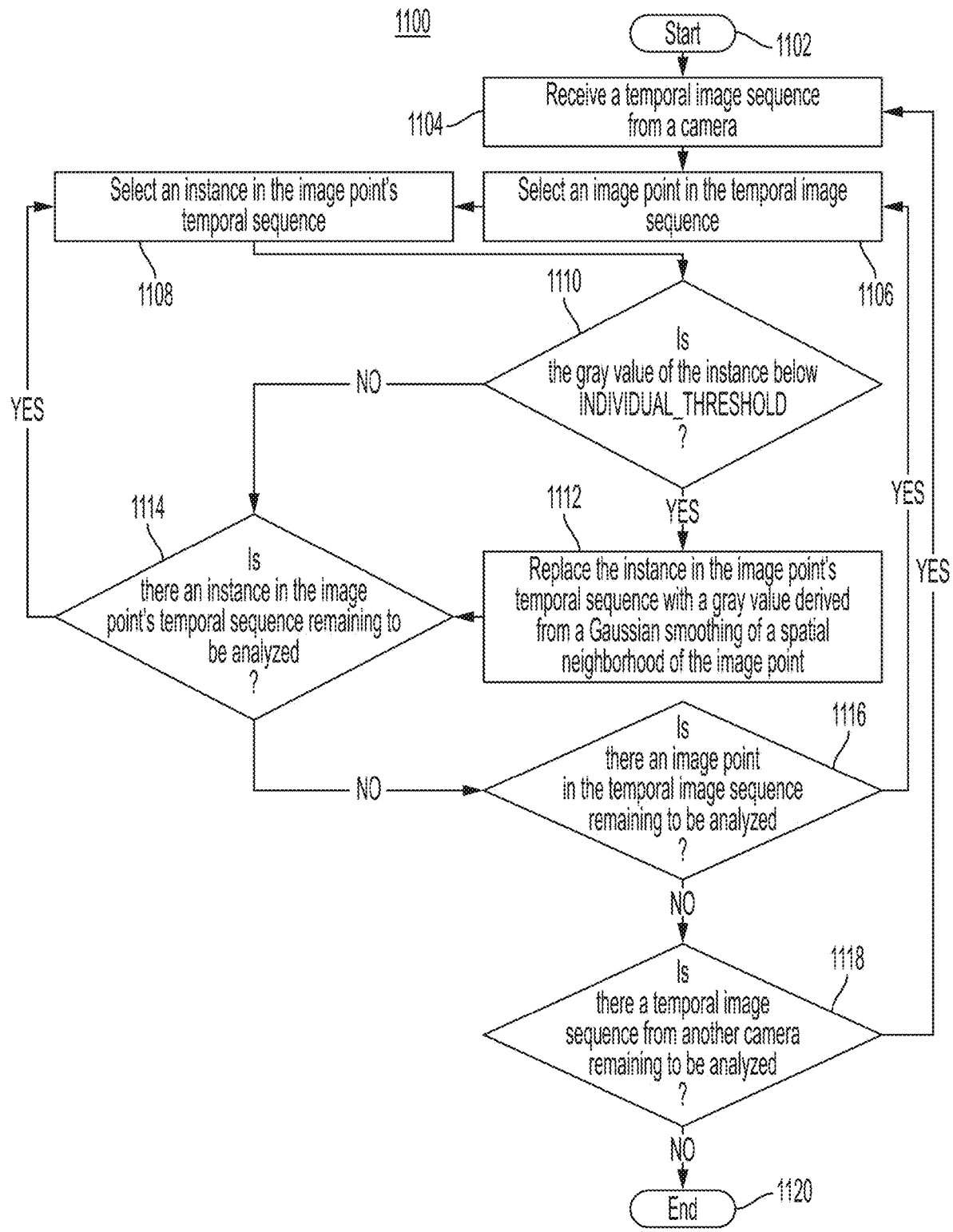
FIG. 11 shows another exemplary computerized method for pre-processing data for stereo-temporal image sequences, according to some embodiments.

In some embodiments, for a given image point of each camera and each temporal gray value instance, it is checked whether the gray value of this temporal instance is below a metric, e.g., a threshold. For exemplary purposes, the examples that follow uses INDIVIDUAL_THRESHOLD to refer to this threshold. The INDIVIDUAL_THRESHOLD may be a user-specified threshold, a camera-specific threshold, or another suitable threshold. The INDIVIDUAL_THRESHOLD may be the same as or differ from the MAX_THRESHOLD. If so, the temporal gray value instance below the INDIVIDUAL_THRESHOLD of this image point in the sequence is replaced by the gray value derived from a smoothing (e.g., a Gaussian smoothing, a bilateral filter, and/or the like) of the respective spatial neighborhood of this image point's temporal instance. The initial correspondence search is conducted on these modified image sequences. The initial correspondence search is performed on the modified image sequences. The correspondence refinement step can be conducted on the modified or original sequence. FIG. 11 and related description provides more detail on this process.

Using a smoothed image sequence for the initial correspondence search only may have one or more of the following exemplary advantages. More valid points may be assigned as correlation-level is increased and moire-effects are minimized. Lateral- and axial resolution may not be affected as subpixel-refinement can be conducted on the original sequences. If the per-instance thresholding option is used, the original data is modified in the least possible way, thus can only be activated for weakly-modulated temporal instances of individual image points.

In some embodiments, the implementation may be conducted in a specific way to work efficiently on certain computing platforms, such as the CUDA parallel computing platform. The correspondence search algorithm may consume stereo image sequences only in 8-bit integer format. A separate stereo image sequence instance with 32-bit-floating-point format may be allocated and smoothing for all image points may be performed in parallel. Just before the actual correspondence search algorithm is executed, the original image sequences may be modified according to the above described pre-processing method. But instead of calculating the smoothed gray values on-the-fly, the smoothed image points may be read from the previously computed 32-bit-floating-point stereo image sequence. Additionally, the resulting gray values may be up-scaled, so that the maximum value of every temporal gray value sequence is exactly 255. This can be done to utilize the full dynamic range of 8-bit integers and minimize rounding errors from floating point to integer (the fractional part may be very significant in this scenario). This can be used, for example, because the correspondence search algorithm may perform a normalization step that eliminates all previous scaling.

In some embodiments, image smoothing may be used for the initial correspondence search as it can increase the robustness and amount of the initial correspondences.

In some aspects, the described systems and methods provide for pre-processing stereo image sequences to enhance correspondence refinement. In some embodiments, a copy of the original sequences is created.

In some embodiments, for a given image point of each camera, it is checked whether the maximum gray value of the whole temporal sequence is below a threshold. For exemplary purposes, the examples that follow use MAX_THRESHOLD to refer to this threshold. The MAX_THRESHOLD may be a user-specified threshold, a camera-specific threshold, or another suitable threshold. If so, each temporal gray value instance of this image point in the sequence is replaced by the gray value derived from a smoothing (e.g., a Gaussian smoothing, a bilateral filter, and/or the like) of the respective spatial neighborhood of this image point. The correspondence refinement is conducted on these modified image sequences. FIG. 10 and related description provides more detail on this process.

In some embodiments, for a given image point of each camera and each temporal gray value instance, it is checked whether the gray value of this temporal instance is below a threshold. For exemplary purposes, the examples that follow use INDIVIDUAL_THRESHOLD to refer to this threshold. The INDIVIDUAL_THRESHOLD may be a user-specified threshold, a camera-specific threshold, or another suitable threshold. The INDIVIDUAL_THRESHOLD may be the same as or differ from the MAX_THRESHOLD. If so, the temporal gray value instance below the INDIVIDUAL_THRESHOLD of this image point in the sequence is replaced by the gray value derived from a smoothing (e.g., a Gaussian smoothing, a bilateral filter, and/or the like) of the respective spatial neighborhood of this image point's temporal instance. The correspondence refinement is conducted on these modified image sequences. FIG. 11 and related description provides more detail on this process.

Using a smoothed image-sequence for the correspondence refinement only may have one or more of the following exemplary advantages. The axial resolution may be improved for image points that fulfilled conditions in either the per-temporal sequence or per-instance options described above, yet reduce lateral resolution slightly for image points that fulfilled these conditions. For dark surfaces (e.g., dark in the image), systematic staircase-like effects may be removed. The overall correlation level may be increased.

In some embodiments, the implementation may be conducted in a specific way to work efficiently on certain computing platforms, such as the CUDA parallel computing platform. The correspondence search algorithm may consume stereo image sequences only in 8-bit-integer format. A separate stereo image sequence instance with 32-bit-floating-point format may be allocated and smoothing for all image points may be performed in parallel. Just before the actual correspondence refinement algorithm is executed, the original image sequences may be modified according to the above described pre-processing method. But instead of calculating the smoothed gray values on-the-fly, the smoothed image points may be read from the previously computed 32-bit-floating-point stereo image sequence. Additionally, the resulting gray values may be up-scaled, so that the maximum value of every temporal gray value sequence is exactly 255. This may be done to utilize the full dynamic range of 8-bit integers and minimize rounding errors from floating point to integer (the fractional part may be very significant in this scenario). There may be no drawback because the correspondence refinement algorithm may perform a normalization step that eliminates all previous scaling.

In some embodiments, image smoothing may be used for subpixel-refinement in order to improve the correspondence assignment for dark surfaces (e.g., dark in the image). It may be only applied to image points and temporal instances having a gray value below a certain threshold in order to avoid worse performance for well-saturated image areas. In some embodiments, it may be beneficial to use image smoothing by default in instances having larger noise of the imager.

Figure 7:
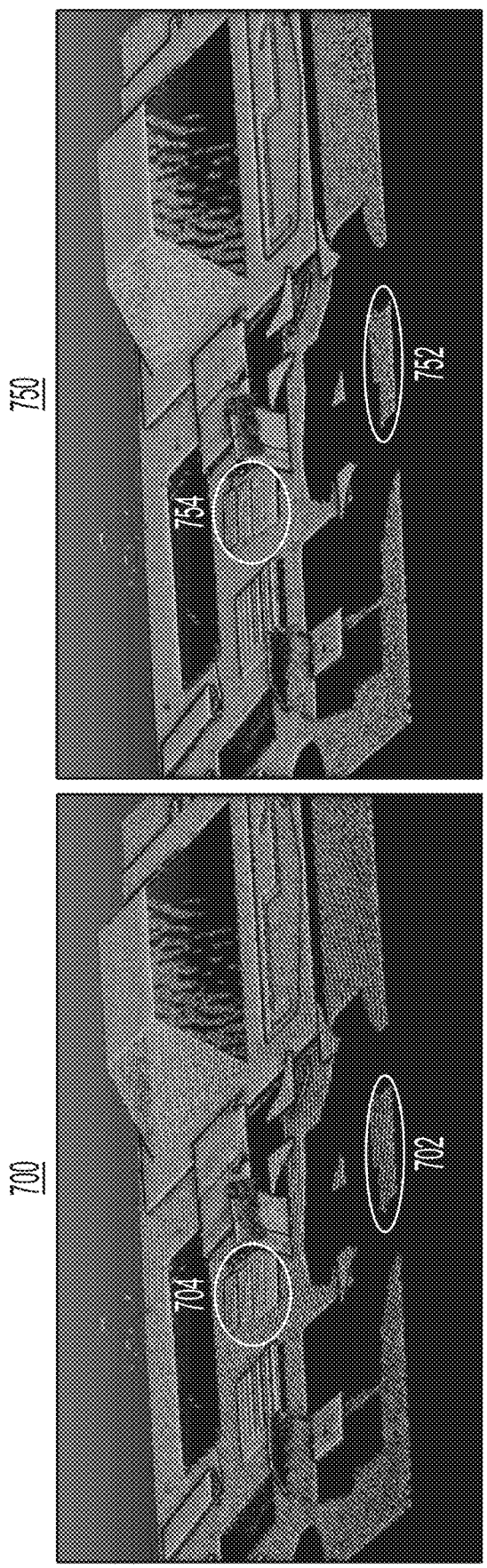
FIG. 7 shows an exemplary reconstruction of a scene with weakly modulated (dark) image points and an exemplary reconstruction of the scene after applying smoothing for correspondence refinement only to the reconstruction of the scene, according to some embodiments.

FIG. 7 shows a reconstruction of a scene 700, with weakly modulated (e.g., dark) image points. Applying the smoothing as described above for the correspondence refinement only, removes systematic errors from the reconstruction as shown in another reconstruction of the scene 750 derived from the same dataset. For example, portion 702 of reconstruction 700 shows step-like artifacts that are removed from corresponding portion 752 of reconstruction 750 after the smoothing is applied. Also noted is that the data remains unaffected with respect to features that are well-modulated. For example, portion 704 of reconstruction 700 shows step-like features that remain present in corresponding portion 754 of reconstruction 750 even after the smoothing is applied.

Figure 8:
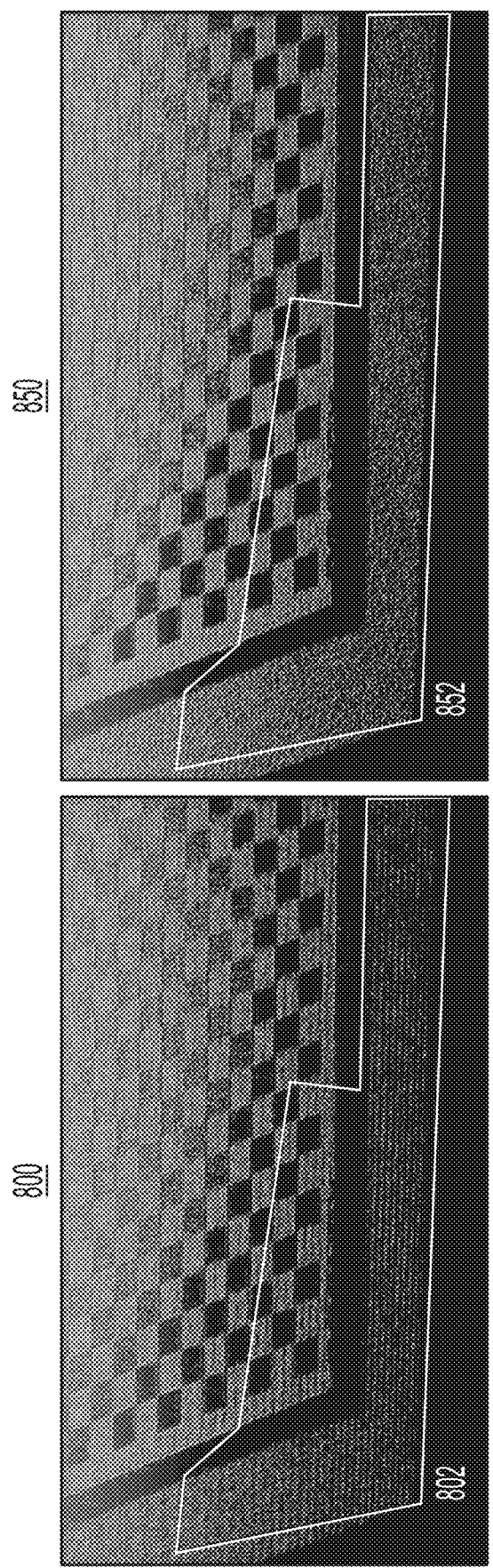
FIG. 8 shows an exemplary reconstruction of another scene with weakly modulated (dark) image points and an exemplary reconstruction of the scene after applying smoothing for correspondence refinement only to the reconstruction of the scene, according to some embodiments.

FIG. 8 shows a reconstruction of a scene 800, with weakly modulated (e.g., dark) image points. Applying the smoothing as described above for the correspondence refinement only, removes systematic errors from the reconstruction as shown in another reconstruction of the scene 850 derived from the same dataset. For example, portion 802 of reconstruction 800 shows step-like artifacts that are removed from corresponding portion 852 of reconstruction 850 after the smoothing is applied.

In some embodiments, the smoothing described in the foregoing does not include oversaturated image points as these hold no valid information and the use of these image points may reduce correspondence assignment accuracy. This may be achieved by bilateral filtering. In some embodiments, a sudden drop of three-dimensional noise as soon as image points fall below the MAX_THRESHOLD or INDIVIDUAL_THRESHOLD may be compensated by using a smoothing applied to all image points, where the strength depends on the max gray value of the image point. Thus, the beneficial effects may gradually kick in the darker the image point is.

FIG. 10 shows an exemplary computerized method 1000 for pre-processing data for stereo-temporal image sequences, according to some embodiments. The described pre-processing may be applied for the initial correspondence search only, the correspondence refinement only, or a combination thereof. At 1002, the process begins. At 1004, a temporal image sequence from one of the cameras is received. For example, a temporal sequence of 12-16 images of an object is received from one of two cameras. At 1006, an image point in temporal image sequence is selected. At 1008, it is checked whether the maximum gray value of the image point's temporal sequence is below the MAX_THRESHOLD. If the maximum gray value of the image point's temporal sequence is below the MAX_THRESHOLD, at 1010, each instance in the image point's temporal sequence is replaced with a gray value derived from a smoothing of the respective spatial neighborhood of this image point. The smoothing can be, for example, a Gaussian filter, a bilateral filter, and/or the like. At 1012, following 1010 (or following 1008 if the maximum gray value of the image point's temporal sequence is not below the MAX_THRESHOLD), it is checked whether there is an image point in the temporal image sequence remaining to be analyzed. If an image point in the temporal image sequence is remaining to be analyzed, at 1006, another image point is selected from the temporal image sequence. If no image point in the temporal image sequence is remaining to be analyzed, at 1014, it is checked whether there is a temporal image sequence from another camera remaining to be analyzed. If there is a temporal image sequence from another camera remaining to be analyzed, at 1004, a temporal image sequence from another camera is received. For example, a temporal sequence of 12-16 images of an object are received from the other of two cameras. If there is no temporal image sequence from another camera remaining to be analyzed, at 1016, the process ends.

FIG. 11 shows another exemplary computerized method 1100 for pre-processing data for stereo-temporal image sequences, according to some embodiments. The described pre-processing may be applied for the initial correspondence search only, the correspondence refinement only, or a combination thereof. At 1102, the process begins. At 1104, a temporal image sequence from one of the cameras is received. For example, a temporal sequence of 12-16 images of an object is received from one of two cameras. At 1106, an image point in temporal image sequence is selected. At 1108, an instance in the image point's temporal sequence is selected. At 1110, it is checked whether the gray value of the selected instance in the image point's temporal sequence is below the INDIVIDUAL_THRESHOLD. If the gray value of the selected instance is below the INDIVIDUAL_THRESHOLD, at 1112, the selected instance in the image point's temporal sequence is replaced with a gray value derived from a smoothing of the respective spatial neighborhood of this image point's temporal instance. At 1114, following 1112 (or following 1110 if the gray value of the selected instance is not below the INDIVIDUAL_THRESHOLD), it is checked whether there is an instance in the image point's temporal sequence remaining to be analyzed. If an instance in the image point's temporal sequence is remaining to be analyzed, at 1108, another instance in the image point's temporal sequence is selected. If no instance in the image point's temporal sequence is remaining to be analyzed, at 1116, it is checked whether there is an image point in the temporal image sequence remaining to be analyzed. If an image point in the temporal image sequence remaining to be analyzed, at 1106, another image point is selected from the temporal image sequence. If no image point in the temporal image sequence is remaining to be analyzed, at 1118, it is checked whether there is a temporal image sequence from another camera remaining to be analyzed. If there is a temporal image sequence from another camera remaining to be analyzed, at 1104, a temporal image sequence from another camera is received. For example, a temporal sequence of 12-16 images of an object are received from the other of two cameras. If there is no temporal image sequence from another camera remaining to be analyzed, at 1120, the process ends.

In some aspects, the techniques discussed herein can be used for improved correspondence refinement for image areas affected by imaging artifacts, such as oversaturation. For example, if a pixel value can range from 0-255, then a value near 255 may be considered an oversaturated value. The true value may be higher than 255 (e.g., 280, 300, etc.), but can't be represented using the pixel and therefore oversaturated pixels may not give useful information (e.g., such that it is not useful for 3-D reconstruction). As noted above, the inventors have recognized that conventional systems do not employ gray-valued temporal illumination sequences and try to take a subset of the information to improve correspondence quality for oversaturated image points. For example, in phase-shifting schemes, can be difficult to employ such an approach because the phase value calculation may need a fixed-phase step between successive temporal values. Thus, masking certain temporal instances may break the phase value calculation or require adapting the chosen phase function on a point per point basis. The inventors have developed techniques, as discussed further herein, that provide for better 3-D data reconstruction by improving correspondence refinement for image areas affected by oversaturation. The described systems and methods use saturation data, such as a set of saturation values, for indicating valid temporal instances (e.g., non-oversaturated or non-overexposed) of the image sequence information acquired to refine correspondences from the initial point search. For example, each saturation value may be a binary value. For example, each saturation value may indicate whether a corresponding pixel value is valid or not, e.g., whether the pixel value is overexposed or not. In some embodiments, the set of saturation values may take the form of a correlation mask that denotes each temporal instance that contains a valid value (e.g., non-overexposed). In some embodiments, if initial correspondences are available, saturation data may store an indication whether the temporal pixel value of the correspondence was oversaturated or not. This data may be used to improve the correspondence refinement, e.g., by extrapolating oversaturated temporal instances of the initial correspondence if the temporal instance of the correspondence is not oversaturated.

In some embodiments, the techniques can be equally applicable to the initial correspondence search step only, the correspondence refinement step only, or a combination thereof. For oversaturated image points, the initial correspondence search may create valid candidates even in severe oversaturation scenarios. However, the refinement of correspondences affected by oversaturation may still not lead to a good improvement on the initial candidate coordinates provided by the initial correspondence search. The refinement step may not lead to an improvement because, in order to refine the correspondences coordinates, sub-pixel gray values often need to be interpolated but interpolation based on oversaturated supporting points may not produce meaningful sub-pixel gray values. The inventors have recognized that it is desirable to improve the refinement accuracy for those correspondences that are affected by oversaturation compared to the above described refinement algorithm. This can increase the applicability of the described systems and methods to situations where oversaturation is unavoidable (e.g., picking and/or placing unknown, varying objects) and/or high dynamic range (HDR) mode is not desired (e.g., a short measurement time is desired) or not helpful (e.g., oversaturation resulting from specular reflection may be hard to cope with even when using HDR).

The described systems and methods for correspondence refinement may greatly improve the refinement results in case of oversaturation, especially for longer sequence acquisitions. The techniques use valid temporal instances (e.g., non-oversaturated or non-overexposed) of the information acquired to refine correspondences from the initial point search. Initially, the techniques acquire stereo image sequences, which are then processed.

In some embodiments, the stereo image sequences are smoothed using filter per image. The original stereo image sequences can also be kept, in some embodiments. The stereo image sequences can be normalized per pixel (e.g., temporal domain). The original stereo image sequences can also be kept, in some embodiments.

Figure 12:
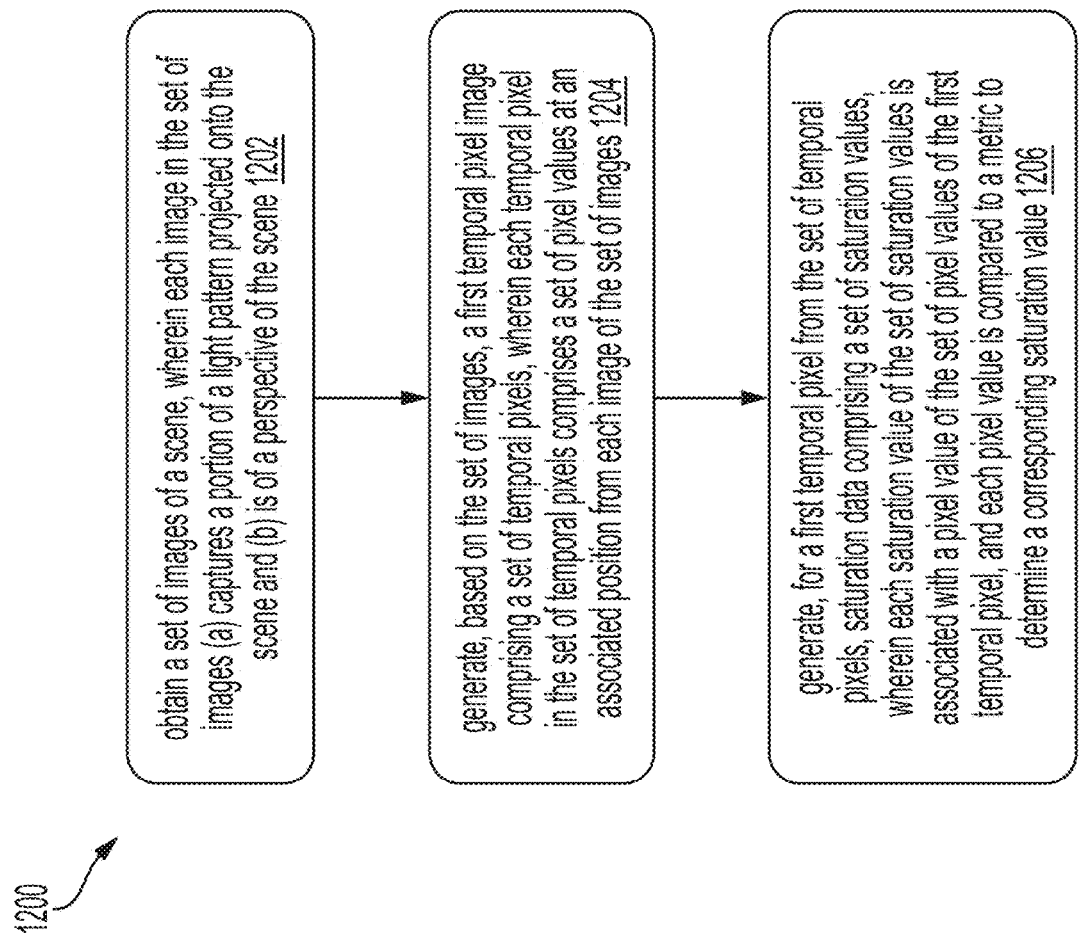
FIG. 12 shows an exemplary computerized method for determining saturation data for a temporal pixel image, according to some embodiments.

FIG. 12 shows an exemplary computerized method 1200 for determining saturation data for a temporal pixel image, according to some embodiments. A system for determining saturation data for a temporal pixel image may comprise a processor in communication with memory. The processor may be configured to execute instructions stored in memory that cause the processor to perform the computerized method.

At 1202, the system may obtain a set of images of a scene. Each image in the set of images may (a) capture a portion of a light pattern projected onto the scene and (b) be of a perspective of the scene.

At 1204, the system may generate, based on the set of images, a first temporal pixel image comprising a set of temporal pixels. Each temporal pixel in the set of temporal pixels may comprise a set of pixel values at an associated position from each image of the set of image.

At 1206, the system may generate, for a first temporal pixel from the set of temporal pixels, saturation data comprising a set of saturation values. Each saturation value of the set of saturation values may be associated with a pixel value of the set of pixel values of the first temporal pixel. Further, each pixel value may be compared to a metric to determine a corresponding saturation value. In some embodiments, each saturation value of the set of saturation values may comprise a binary value. For example, each saturation value may indicate whether a corresponding pixel value is valid or not, e.g., whether the pixel value is overexposed or not. In some embodiments, the metric, e.g., a threshold, may relate to a degree of overexposure in the set of images.

In some embodiments, the system may determine a stereo correspondence between the set of images and a second set of images captured from a different perspective than the perspective of the set of images. The system may determine the stereo correspondence based on the saturation data and second saturation data, determined based on the second set of images. The system may exclude a temporal pixel from the set of images and/or the second set of images that does not include a minimum number of valid pixel values in a set of pixel values of the temporal pixel.

In some embodiments, a set of saturation values in the form of a correlation mask per image point is created based on the original stereo image sequences. The correlation mask marks each temporal instance that contains a valid gray value (e.g., non-overexposed) with a 1.0. The valid gray value may be a value below a threshold. The correlation mask marks each temporal instance that is overexposed with a 0.0. Counting the number of temporal instances marked with a 1.0 in the correlation mask leads to a number of valid instances for that image point. For exemplary purposes, the examples that follow use VALID_INSTANCES to refer to the valid instances for the image point, VALID_INSTANCES_C1 to refer to the valid instances for the image point with respect to a first camera, camera 1, and VALID_INSTANCES_C2 to refer to the valid instances for the image point with respect to a second camera, camera 2.

The initial correspondences can be searched for using one or a combination of the sequences described above. In some embodiments, the found initial correspondences may be stored for later refinement, and/or the refinement may be conducted directly after the pair has been found. Alternatively or additionally, based on the correlation mask, only those temporal instances are used for correlation that contain valid (e.g., non-overexposed) gray values and the number of mutual valid temporal instances of a potential correspondence is greater than or equal to a threshold (referred to MIN_VALID_INSTANCES for exemplary purposes). The found initial correspondences may be stored for later refinement, and/or the refinement may be conducted directly after the pair has been found.

The correspondence refinement for a given initial correspondence is performed using one or a combination of the sequences described above. In some embodiments, the sub-pixel interpolation may be limited to temporal instances where there is no oversaturation in the whole interpolation area (e.g., the gray values in the spatial neighborhood of the pixel used for interpolation, such as 3×3 or 5×5, etc.) and there is no oversaturation in the reference sequence. This may be determined using the correlation mask information. Therefore, for example, this can exclude an oversaturated pixel, and therefore one less image may be used because there was oversaturation. Alternatively or additionally, the sub-pixel interpolation may be limited to temporal instances where the number of oversaturated image points in the whole interpolation area is equal to or less than a threshold (referred to MAX_OVEREXPOSED_NEIGHBORHOOD for exemplary purposes) and there is no oversaturation in the reference sequence. This may be determined using the correlation mask information. Therefore, for example, a certain amount of oversaturated points can be accepted. For example, if there are 25 points, then it may be acceptable if there are no more than five oversaturated points.

Alternatively or additionally, based on VALID_INSTANCES_C1 and VALID_INSTANCES_C2 described above, an image sequence of one of two cameras, e.g., camera 1 or camera 2, may be chosen to be used for interpolation. If VALID_INSTANCES_C1 is greater than VALID_INSTANCES_C2, the interpolation may be conducted using the sequence of camera 1. If VALID_INSTANCES_C1 is less than VALID_INSTANCES_C2, the interpolation may be conducted using the sequence of camera 2. The interpolation itself may be conducted according to the techniques described above. Therefore, for example, by counting the oversaturation instances in camera 1 and camera 2, the techniques can determine whether to perform interpolation in camera 1 or camera 2.

In some embodiments, after the refinement has been finished, a hole filling technique may optionally be employed to create correspondences for non-assigned overexposed image points. For each non-assigned image point that showed oversaturation, it is checked if there are correspondences surrounding this image point and a corresponding image point is estimated based on the surrounding correspondence information.

The described systems and methods for correspondence refinement may have one or more of the following exemplary advantages. The described correspondence refinement approach may be advantageous over phase-shifting approaches because phase-shifting approaches cannot accommodate the correlation masking in their phase value calculations. Additionally, it may be sufficient to limit the correlation mask usage to the refinement process (thus, computation speed penalty may be limited). In case of oversaturation, the reconstruction of overexposed image points may be greatly improved as long as there are sufficient temporal instances that were not overexposed.

In some embodiments, although it may take more computational time, a full forward and a full backward search may be conducted and then the correspondences may be combined to lead to a more complete reconstruction for overexposed image points. In such exemplary embodiments, the correlation mask in the interpolating camera may only be based on the correspondence itself and therefore need not take into account oversaturation in the interpolation area.

In some embodiments, it may be advantageous to use spatial information for an image point having VALID_INSTANCES less than MIN_VALID_INSTANCES, in order to still be able to reconstruct the point, yet at reduced lateral and axial resolution. This approach may especially be helpful for shorter sequence lengths and situations where a hole filling may not be effective.

In some aspects, the techniques discussed herein can be used to fill missing correspondences to improve 3-D reconstruction. The inventors have appreciated that existing stereo image technologies do not adequately calculate correspondences for all image points. For example, since existing image processing techniques may not calculate correspondences for many of the image points, there may be missing and/or erroneous 3-D data in 3-D reconstructions. The inventors have developed techniques to both calculate approximated correspondences, and to cross-check the calculated correspondences. Performing one or more cross-checks is important to validate the approximated correspondences to determine whether the approximated correspondences should be used for further image processing. Most known approaches have the goal to fill as many holes as possible, yet they risk filling holes with depth-data where the actual scene does not justify a/the approximated depth-data.

In some embodiments, stereo vision systems may include additional hardware attached to the imaging heads (e.g. a thermal-camera, color-camera, and/or the like). Such additional hardware can provide additional information of a scene imaged by the stereo vision system. Also, some systems may use three (or more) camera-systems, and therefore the concept discussed herein in the context of stereo pairs can be extended to take into account "correspondence-chains" across three (or more) images.

Stereo images are processed to ultimately generate 3-D data, referred to as a 3-D reconstruction. Part of this process is the pixel correlation process, discussed above, that is used to correlate object points across the images of each stereo pair. After performing a pixel correspondence process (e.g., such as the two-step correspondence assignment process discussed above), in an ideal case, there is a correspondence-pair for each object point that is visible in both cameras of the stereo-vision system.

However, there may be situations in which there are no correspondences for an object point that is visible in both cameras. For example, if there is oversaturation in one or both of the camera views, then the correspondence process (e.g., including both an initial and refinement step) may fail to determine a correspondence. As another example, if there is only low-modulation in one or both of the cameras, then the correspondence process may fail to yield a correspondence, and/or may assign an incorrect correspondence (e.g., which may be filtered by an outlier removal stage). As a further example, if the object being examined has a high-frequency texture (e.g., texture in albedo, color, and/or the like), then certain areas of the object may not lead to a correspondence. As another example, if there is inter-scene reflection in the scene being imaged, then the correspondence process may fail to yield a correspondence.

The inventors have developed techniques to achieve correspondences for points that may not otherwise not yield correspondences. For example, when using a two-step process that performs an initial search and then a refinement stage, the techniques may be used for one or both steps, as discussed herein. The techniques can be used to approximate correspondences for points that do not otherwise have correspondences (e.g., since a correspondence process failed to determine any correspondences) by using information of related correspondences (e.g., correspondences for nearby points, neighboring points, and/or the like). For example, over-saturated points may not result in any correspondences. The disclosed hole-filling techniques can be configured to identify certain points and/or pixels (e.g., oversaturated image points, for this non-limiting example) that do not have correspondences, and to generate approximate correspondences based on related correspondences. The approximated correspondences are cross-checked using available information (e.g., based on the spatial and/or temporal properties (e.g., such as variances, oversaturation, and/or the like), texture information, color information, thermal information, multi-modal information, and/or the like).

Figure 13:
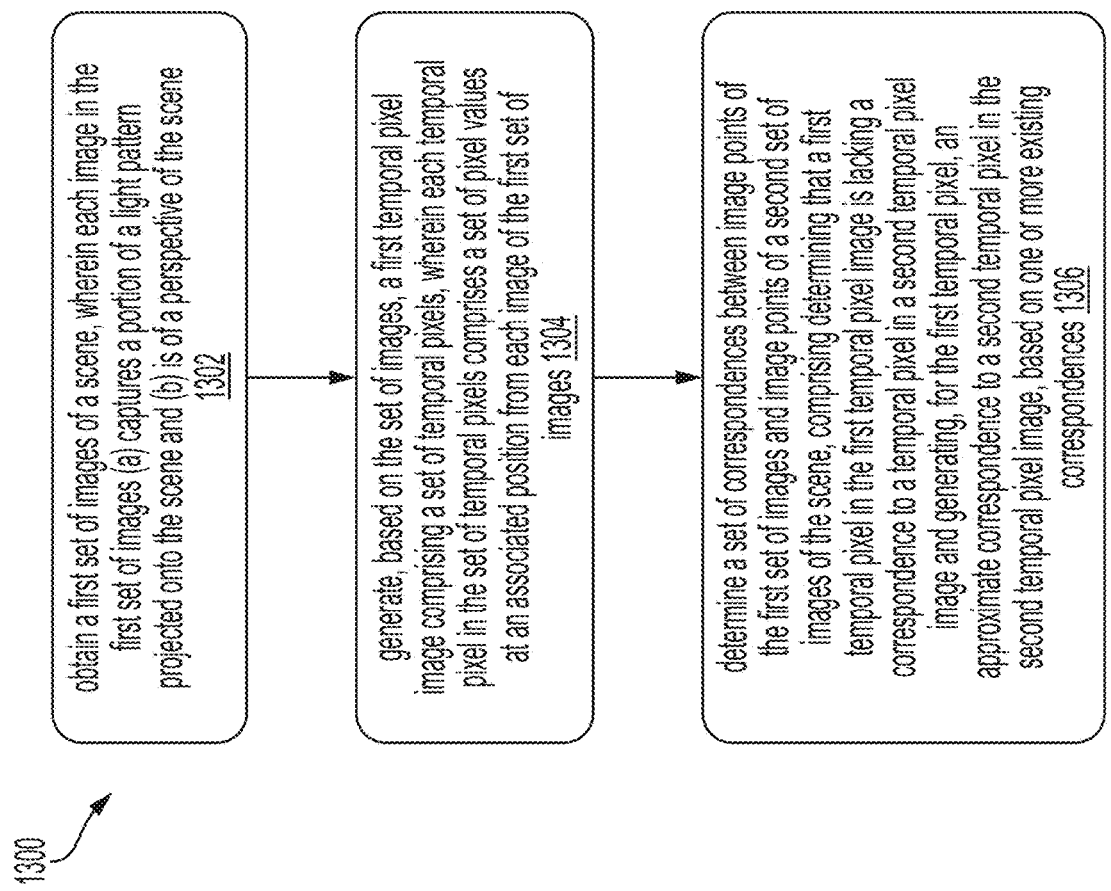
FIG. 13 shows an exemplary computerized method for determining stereo correspondence between a first set of images and a second set of images, according to some embodiments.

FIG. 13 shows an exemplary computerized method 1300 for determining stereo correspondence between a first set of images and a second set of images, according to some embodiments. A system for determining stereo correspondence between a first set of images and a second set of images may comprise a processor in communication with memory. The processor may be configured to execute instructions stored in memory that cause the processor to perform the computerized method.

At 1302, the system may obtain a first set of images of a scene. Each image in the first set of images may (a) capture a portion of a light pattern projected onto the scene and (b) be of a perspective of the scene.

At 1304, the system may generate, based on the first set of images, a first temporal pixel image comprising a set of temporal pixels. Each temporal pixel in the set of temporal pixels may comprise a set of pixel values at an associated position from each image of the first set of images.

At step 1306, the system may determine a set of correspondences between image points of the first set of images and image points of a second set of images of the scene captured from a different perspective than the first set of images. The system may determine the set of correspondences by determining that a first temporal pixel in the first temporal pixel image is lacking a correspondence to a temporal pixel in a second temporal pixel image determined based on the second set of images. For example, no correspondence for the first temporal pixel may have yet been determined, correspondence search for the first temporal pixel may been attempted but have failed, or otherwise correspondence for the first temporal pixel may be lacking for another suitable reason. The system may further generate, for the first temporal pixel, an approximate correspondence to a second temporal pixel in the second temporal pixel image based on one or more existing correspondences. Each existing correspondence may be between a temporal pixel in the first temporal pixel image and a temporal pixel in the second temporal pixel image and satisfy a relation metric with respect to the first temporal pixel.

In some embodiments, the existing correspondences may relate to temporal pixels in the first temporal pixel image that are spatially proximate to the first temporal pixel. The relation metric may relate to a degree of spatial proximity to the first temporal pixel.

Figure 15:
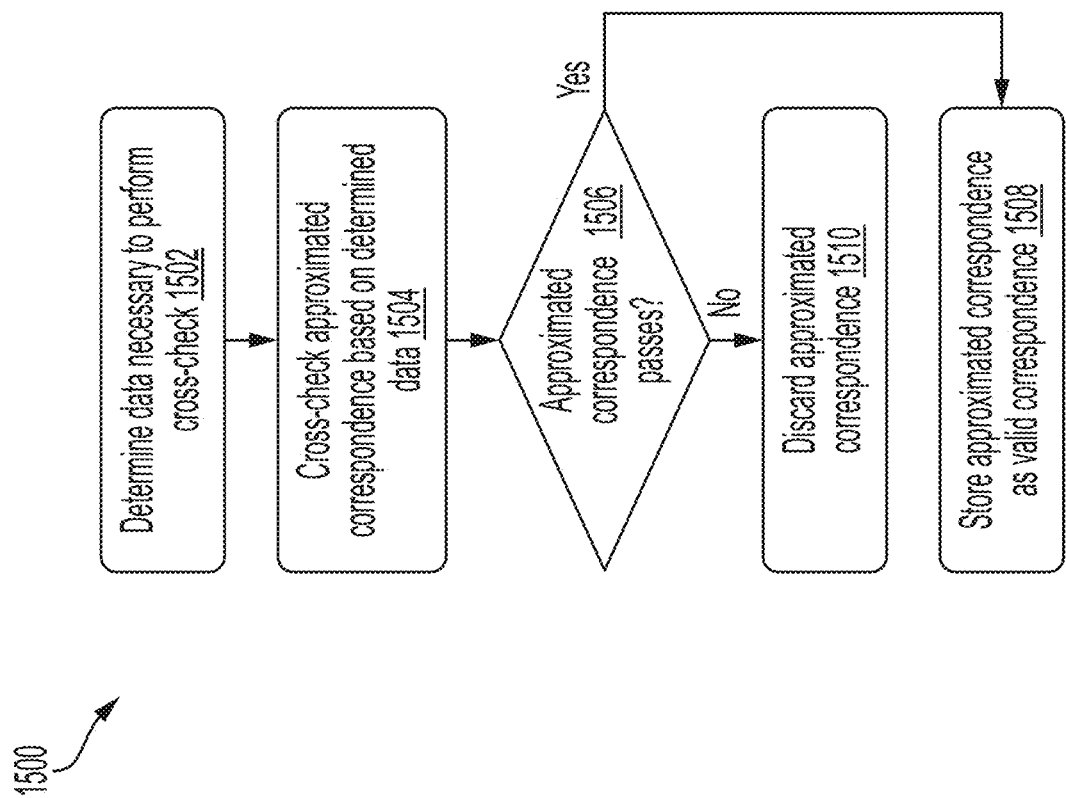
FIG. 15 shows an exemplary computerized method for cross-checking an approximated correspondence, according to some embodiments.

In some embodiments, the system may verify the approximate correspondence based on spatial information, temporal information, or both, relating to the first temporal pixel, the second temporal pixel, or both. For example, the system may determine whether one or more pixel values in the first temporal pixel, the second temporal pixel, or both, are overexposed. In another example, the system may determine whether one or more temporal pixels spatially proximate to the first temporal pixel share a property with one or more temporal pixels spatially proximate to the second temporal pixel, e.g., a color, a temperature, and/or a texture. FIG. 15 and related description provides more detail on this process.

Figure 14:
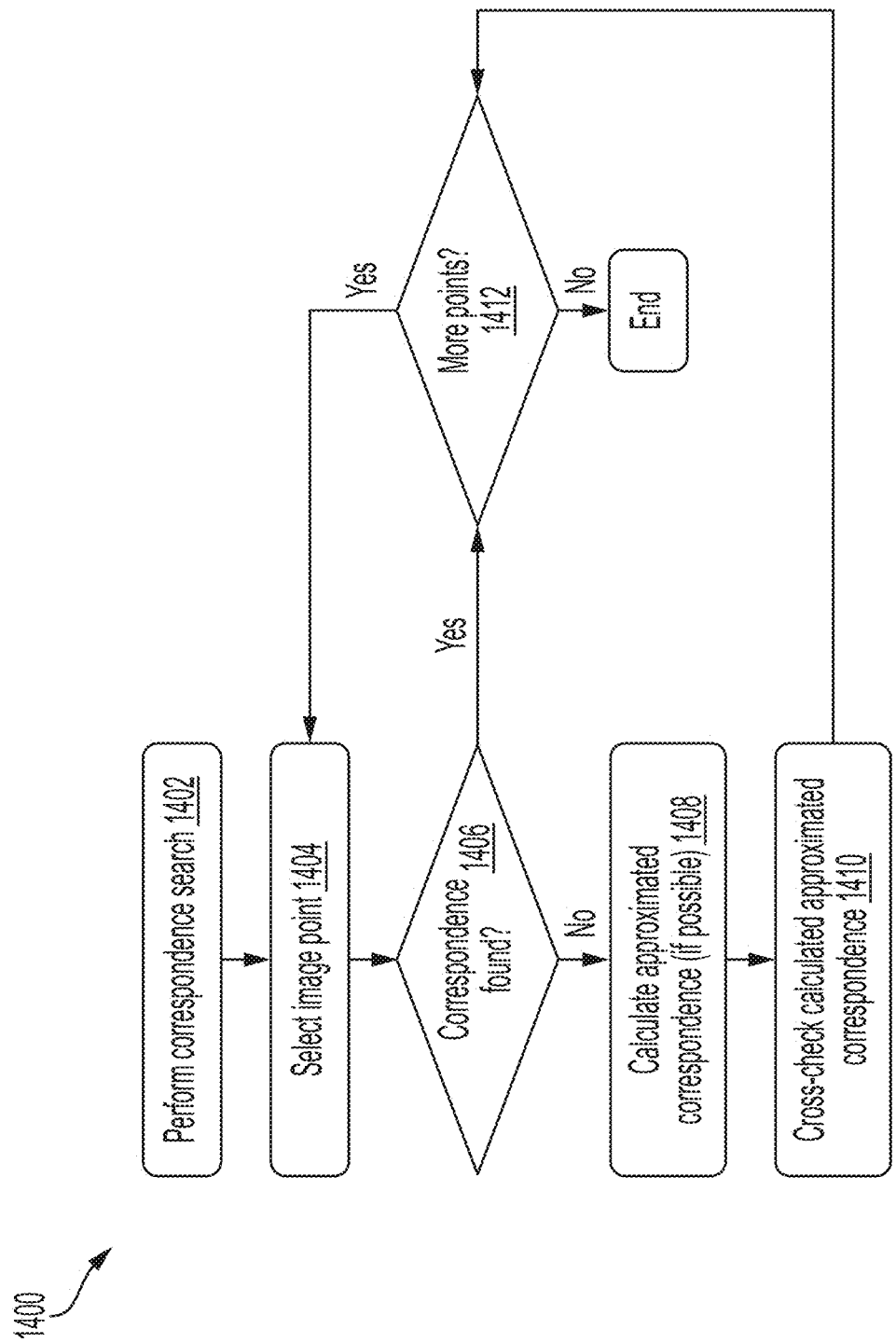
FIG. 14 shows an exemplary computerized method for generating approximated correspondences, according to some embodiments.

FIG. 14 shows an exemplary computerized method 1400 for generating approximated correspondences, according to some embodiments. As noted above, the techniques can be used to complete points that would otherwise not have correspondences. At step 1402, a correspondence search is performed for an image pair. As discussed above, the correspondence search can include an initial correspondence search to generate a set of rough estimates of potential correspondences. For example, the first search can be at the pixel level. A refinement step can be performed using the initial set of correspondences to precisely locate correspondences. For example, the second search can be at the sub-pixel level. Optionally, the set of correspondences after the first and/or second steps can be reviewed to remove outlier correspondences (e.g., known to be incorrect based on thresholds, etc.).

At step 1404, an image point is selected, such that as shown by other steps in FIG. 14, each image point is checked at step 1406 to determine if a correspondence was found for the image point. If not, the method 1400 proceeds to step 1408, and the system determines, based on other available correspondences and/or information, whether it can calculate an approximated correspondence. In some embodiments, the techniques can include analyzing neighboring image points to determine whether the neighboring image points have correspondences. Assume, for exemplary purposes, that no correspondence was found for an image point (x,y). The system can determine whether there are image points (x'_k,y'_k) within the neighborhood around the image point (x,y) that have correspondences (e.g., calculated in the correspondence search), where k is a positive or negative offset value within which to search for neighboring points. For example, k may be 1, 2, 3, and/or the like. If there are image points, generally referred to as (x'_k,y'_k), that have a correspondence, the system can calculate an approximated correspondence between (x_1,y_1), which is the point (x,y) in the image acquired by camera one (1), and (x_2, y_2), which is the point (x,y) in the image acquired by camera two (2). If there are no such image points, then the system can be configured to not determine an approximated correspondence for the particular image point.

At step 1410, the system then cross-checks the approximated correspondences. FIG. 15 shows an exemplary computerized method 1500 for cross-checking an approximated correspondence, according to some embodiments. At step 1502, the method 1500 determines data necessary to perform the cross-check, if any. The cross-check can take into account various data, such as the nature of the missing initial correspondence (e.g., oversaturated temporal instances, low modulation, object texture, inter-scene reflection, and/or the like). In some embodiments, cross-checking the approximated correspondence can be performed based on spatial information (e.g., a spatial intensity variance), temporal information (e.g., a temporal intensity variance), texture information, color information, thermal and/or multi-modal information (e.g., if additional hardware is used that can generate such information), and/or the like.

At step 1504, the system uses any necessary data obtained at step 1502 to cross-check the approximated correspondence. The cross-checks can be based on either, or both, of the image pair points. In some embodiments, only one of the image points of the approximated correspondence pairs needs to fulfill the cross-check criteria. For example, if (x_1,y_1) or (x_2,y_2) contain oversaturated temporal instances (e.g., pixels with values above a threshold that indicates a pixel may be saturated), then the approximated correspondence-pair can be accepted as a valid correspondence and added to the correspondences. For example, this can be done to confirm the techniques found approximated correspondence for points that did not have correspondences due to oversaturation (e.g., as opposed to other reasons). In some embodiments, both image points can be tested to meet the criteria. For example, when checking for a color property of the approximated correspondence, it may be desirable to enforce that both image points of the approximated correspondence pair fulfill the criteria. As another example, if the color is given by three eight-bit integers for an rgb-image, the techniques can be configured to perform a threshold on one or more channels (e.g., looking for a certain red channel value; looking for a blue-channel<BLUE_THRESHOLD; a green-channel<GREEN_THRESHOLD; abs(RED-CHANNEL of Camera1_x1_y1–RED-CHANNEL of Camera2_x2_y2)<RED_THRESHOLD; and/or the like). As a further example, if a thermal camera is used, the system can be configured to determine whether the correspondences have a similar temperature (e.g., (TEMP_Camera1_x1_y1– TEMP_Camera2_x2_y2)<TEMP_THRESHOLD). As another example, color can be used to validate the approximated correspondence. For example, if the image point and neighboring points all share a same color (e.g., red), the system may validate the approximated correspondence since it is likely that the points are part of the same object.

At step 1506, if the approximated correspondence satisfies the one or more cross-checks, the method 1500 proceeds to step 1508 and the system can add the approximated correspondence as a valid correspondence. Otherwise, the method proceeds to step 1510 and the system can discard the approximate correspondence. While FIG. 15 shows a process for performing a single cross-check, a plurality of cross-checks can be configured, as necessary (e.g., for the particular implementation).

Referring back to FIG. 14, after step 1410 the method 1400 proceeds to step 1412. At step 1412, the method determines if there are more image points to check. If so, the method proceeds back to step 1404. If not, the method ends.

In some embodiments, the approximated correspondence process can be repeated in an iterative manner. For example, an iterative process may calculate additional approximated correspondences, since approximated correspondences themselves can be used as a supporting data point for image points that have not yet been assigned an approximated correspondence. As discussed in conjunction with the example method 1400 in FIG. 14, the correspondence approximation techniques can be applied after performing a correspondence search. In some embodiments, the techniques can be applied as part of the correspondence search. For example, for a multi-stage correspondence search, the approximation techniques may be applied after the initial-point search (e.g., the pixel-level search). Performing the approximation techniques as part of the correspondence search can approximate correspondences that are used by subsequent stages in the correspondence search (e.g., for a refinement step that achieves sub-pixel accuracy). In some embodiments, the approximation techniques can be applied before a refinement step to determine whether the approximated correspondences should be discarded by such refinement (e.g., since certain approximated correspondences may fail the refinement process).

Once the set of correspondences and approximated correspondences are determined, the 3-D information can be triangulated using stereo vision techniques known to those skilled in the art. By filling otherwise missing correspondences with the cross-checked approximated correspondences, more robust 3-D data can be obtained than otherwise possible using just the initial set of correspondences. For example, more robust 3-D data can be achieved even when the images/process are subject to oversaturation, low modulation, object texture, inter-scene reflection, and/or other imaging artifacts. Due to increased completeness of the reconstructed 3-D data, post-processing algorithms (e.g. bin-picking of boxes) may work more robustly. As another example, the cross-checks can be configured so that the approximated correspondence process acts selectively in order to minimize creating phantom points in the reconstructed 3-D data. As a further example, the techniques can be implemented in a manner that can be implemented via a GPU in a manner that can perform the approximation process with sufficient speed (e.g., less than approximately lms (based on tests)).

While the techniques disclosed herein have been discussed in conjunction with stereo approaches (e.g., temporal stereo approaches, such as sequence acquisition), the techniques are no so limited. For example, the techniques may be used for single-image approaches (e.g., active & passive techniques).

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Various aspects are described in this disclosure, which include, but are not limited to, the following aspects:

(1) A system for pre-processing a temporal pixel image, the system comprising a processor in communication with memory, the processor being configured to execute instructions stored in memory that cause the processor to:

obtain a set of images of a scene, wherein each image in the set of images (a) captures a portion of a light pattern projected onto the scene and (b) is of a perspective of the scene;

generate, based on the set of images, a first temporal pixel image comprising a set of temporal pixels, wherein each temporal pixel in the set of temporal pixels comprises a set of pixel values at an associated position from each image of the set of images; and generate, based on the first temporal pixel image, a first modified temporal pixel image, comprising modifying a first temporal pixel from the set of temporal pixels, comprising:

comparing the first temporal pixel to a metric; and
based on the comparison, replacing one or more pixel values of the first temporal pixel with another value determined based on the first temporal pixel and/or one or more temporal pixels spatially proximate to the first temporal pixel.

(2) The system of (1), wherein the instructions further cause the processor to:
determine a stereo correspondence between the set of images and a second set of images, wherein the second set of images is captured from a different perspective than the perspective of the set of images, based on the first modified temporal pixel image and a second modified temporal pixel image determined based on the second set of images.

(3) The system of (1) or (2), wherein the metric relates to a degree of underexposure in the set of images.

(4) The system of any one of (1) through (3), wherein comparing the first temporal pixel to the metric comprises comparing whether a maximum of pixel values in the first temporal pixel is below the metric.

(5) The system of (4), wherein replacing one or more pixel values of the first temporal pixel with another value determined based on the first temporal pixel and/or one or more temporal pixels spatially proximate to the first temporal pixel comprises replacing each pixel value in the first temporal pixel with a pixel value derived from a Gaussian smoothing of the first temporal pixel and/or the one or more temporal pixels in a spatial neighborhood of the first temporal pixel.

(6) The system of any one of (1) through (5), wherein comparing the first temporal pixel to the metric comprises comparing whether each pixel value in the first temporal pixel is below the metric.

(7) The system of (6), wherein replacing one or more pixel values of the first temporal pixel with another value determined based on the first temporal pixel and/or one or more temporal pixels spatially proximate to the first temporal pixel comprises replacing each pixel value in the first temporal pixel that is below the metric with a pixel value derived from a Gaussian smoothing of the first temporal pixel and/or the one or more temporal pixels in a spatial neighborhood of the first temporal pixel.

(8) The system of any one of (1) through (7), wherein the instructions further cause the processor to:
obtain the second set of images of the scene, wherein each image in the second set of images (a) captures a portion of a light pattern projected onto the scene and (b) is of a different perspective of the scene than the perspective of the set of images;
generate, based on the second set of images, a second temporal pixel image comprising a second set of temporal pixels, wherein each temporal pixel in the second set of temporal pixels comprises a set of pixel values gathered at an associated second position from each image of the second set of images; and
generate, based on the second temporal pixel image, a second modified temporal pixel image, comprising modifying a second temporal pixel from the second set of temporal pixels, comprising:
comparing the second temporal pixel to the metric; and
based on the comparison, replacing one or more pixel values of the second temporal pixel with another value determined based on the second temporal pixel and/or one or more temporal pixels spatially proximate to the second temporal pixel.

(9) A computerized method for pre-processing a temporal pixel image, the method comprising:
obtaining a set of images of a scene, wherein each image in the set of images (a) captures a portion of a light pattern projected onto the scene and (b) is of a perspective of the scene;
generating, based on the set of images, a first temporal pixel image comprising a set of temporal pixels, wherein each temporal pixel in the set of temporal pixels comprises a set of pixel values at an associated position from each image of the set of images; and
generating, based on the first temporal pixel image, a first modified temporal pixel image, comprising modifying a first temporal pixel from the set of temporal pixels, comprising:
comparing the first temporal pixel to a metric; and
based on the comparison, replacing one or more pixel values of the first temporal pixel with another value determined based on the first temporal pixel and/or one or more temporal pixels spatially proximate to the first temporal pixel.

(10) The method of (9), the method further comprising:
determine a stereo correspondence between the set of images and a second set of images, wherein the second set of images is captured from a different perspective than the perspective of the set of images, based on the first modified temporal pixel image and a second modified temporal pixel image determined based on the second set of images.

(11) The method of (9) or (10), wherein the metric relates to a degree of underexposure in the set of images.

(12) The method of any one of (9) through (11), wherein comparing the first temporal pixel to the metric comprises comparing whether a maximum of pixel values in the first temporal pixel is below the metric.

(13) The method of (12), wherein replacing one or more pixel values of the first temporal pixel with another value determined based on the first temporal pixel and/or one or more temporal pixels spatially proximate to the first temporal pixel comprises replacing each pixel value in the first temporal pixel with a pixel value derived from a Gaussian smoothing of the first temporal pixel and/or the one or more temporal pixels in a spatial neighborhood of the first temporal pixel.

(14) The method of any one of (9) through (13), wherein comparing the first temporal pixel to the metric comprises comparing whether each pixel value in the first temporal pixel is below the metric.

(15) The method of (14), wherein replacing one or more pixel values of the first temporal pixel with another value determined based on the first temporal pixel and/or one or more temporal pixels spatially proximate to the first temporal pixel comprises replacing each pixel value in the first temporal pixel that is below the metric with a pixel value derived from a Gaussian smoothing of the first temporal pixel and/or the one or more temporal pixels in a spatial neighborhood of the first temporal pixel.

(16) The method of any one of (9) through (15), the method further comprising:
obtaining the second set of images of the scene, wherein each image in the second set of images (a) captures a portion of a light pattern projected onto the scene and (b) is of a different perspective of the scene than the perspective of the set of images;
generating, based on the second set of images, a second temporal pixel image comprising a second set of temporal pixels, wherein each temporal pixel in the second set of temporal pixels comprises a set of pixel values gathered at an associated second position from each image of the second set of images; and generating, based on the second temporal pixel image, a second modified temporal pixel image, comprising modifying a second temporal pixel from the second set of temporal pixels, comprising:

comparing the second temporal pixel to the metric; and
based on the comparison, replacing one or more pixel values of the second temporal pixel with another value determined based on the second temporal pixel and/or one or more temporal pixels spatially proximate to the second temporal pixel.

(17) At least one non-transitory computer-readable storage medium storing processor-executable instructions that, when executed by at least one computer hardware processor, cause the at least one computer hardware processor to perform the acts of:

obtaining a set of images of a scene, wherein each image in the set of images (a) captures a portion of a light pattern projected onto the scene and (b) is of a perspective of the scene;

generating, based on the set of images, a first temporal pixel image comprising a set of temporal pixels, wherein each temporal pixel in the set of temporal pixels comprises a set of pixel values at an associated position from each image of the set of images; and generating, based on the first temporal pixel image, a first modified temporal pixel image, comprising modifying a first temporal pixel from the set of temporal pixels, comprising:

comparing the first temporal pixel to a metric; and
based on the comparison, replacing one or more pixel values of the first temporal pixel with another value determined based on the first temporal pixel and/or one or more temporal pixels spatially proximate to the first temporal pixel.

(18) A system for determining saturation data for a temporal pixel image, the system comprising a processor in communication with memory, the processor being configured to execute instructions stored in memory that cause the processor to:

obtain a set of images of a scene, wherein each image in the set of images (a) captures a portion of a light pattern projected onto the scene and (b) is of a perspective of the scene;

generate, based on the set of images, a first temporal pixel image comprising a set of temporal pixels, wherein each temporal pixel in the set of temporal pixels comprises a set of pixel values at an associated position from each image of the set of images; and generate, for a first temporal pixel from the set of temporal pixels, saturation data comprising a set of saturation values, wherein:

each saturation value of the set of saturation values is associated with a pixel value of the set of pixel values of the first temporal pixel; and each pixel value is compared to a metric to determine a corresponding saturation value.

(19) The system of (18), wherein the instructions further cause the processor to:

determine a stereo correspondence between the set of images and a second set of images, wherein the second set of images is captured from a different perspective than the perspective of the set of images, based at least on the saturation data and second saturation data determined based on the second set of images.

(20) The system of (19), wherein the stereo correspondence between the set of images and the second set of images is determined based on the saturation data, the second saturation data, the set of images, and the second set of images.

(21) The system of any one of (18) through (20), wherein each saturation value of the set of saturation values comprises a binary value.

(22) The system of any one of (18) through (21), wherein each saturation value of the set of saturation values indicates whether a related pixel value is valid or not.

(23) The system of (22), wherein the pixel value being valid comprises a corresponding pixel not being overexposed.

(24) The system of any one of (18) through (23), wherein the metric relates to a degree of overexposure in the set of images.

(25) The system of (19), wherein determining stereo correspondence between the set of images and the second set of images comprises excluding a temporal pixel from the set of images and/or the second set of images that does not include a minimum number of valid pixel values in a set of pixel values of the temporal pixel.

(26) The system of (19), wherein determining stereo correspondence between the set of images and the second set of images comprises excluding a temporal pixel from the set of images and/or the second set of images that has more than a threshold number of temporal pixels spatially proximate to the temporal pixel, each of which does not include a minimum number of valid pixel values in a set of pixel values of the spatially proximate temporal pixel.

(27) The system of any one of (18) through (26), wherein the processor is further configured to perform the acts of:

obtain the second set of images of the scene, wherein each image in the second set of images (a) captures a portion of a light pattern projected onto the scene and (b) is of a different perspective of the scene than the perspective of the set of images;

generate, based on the second set of images, a second temporal pixel image comprising a second set of temporal pixels, wherein each temporal pixel in the second set of temporal pixels comprises a set of pixel values gathered at an associated second position from each image of the second set of images;

generate, for a second temporal pixel from the second set of temporal pixels, second saturation data comprising a second set of saturation values, wherein:

each saturation value of the second set of saturation values is associated with a pixel value of the set of pixel values of the second temporal pixel; and each pixel value is compared to the metric to determine a corresponding saturation value.

(28) A computerized method for determining saturation data for a temporal pixel image, the method comprising:

obtaining a set of images of a scene, wherein each image in the set of images (a) captures a portion of a light pattern projected onto the scene and (b) is of a perspective of the scene;

generating, based on the set of images, a first temporal pixel image comprising a set of temporal pixels, wherein each temporal pixel in the set of temporal pixels comprises a set of pixel values at an associated position from each image of the set of images; and generating, for a first temporal pixel from the set of temporal pixels, saturation data comprising a set of saturation values, wherein:

each saturation value of the set of saturation values is associated with a pixel value of the set of pixel values of the first temporal pixel; and each pixel value is compared to a metric to determine a corresponding saturation value.

(29) The method of (28), the method further comprising: determine a stereo correspondence between the set of images and a second set of images, wherein the second set of images is captured from a different perspective than the perspective of the set of images, based at least on the saturation data and second saturation data determined based on the second set of images.

(30) The method of (29), wherein the stereo correspondence between the set of images and the second set of images is determined based on the saturation data, the second saturation data, the set of images, and the second set of images.

(31) The method of any one of (28) through (30), wherein each saturation value of the set of saturation values comprises a binary value.

(32) The method of any one of (28) through (31), wherein each saturation value of the set of saturation values indicates whether a related pixel value is valid or not.

(33) The method of (32), wherein the pixel value being valid comprises a corresponding pixel not being overexposed.

(34) The method of any one of (28) through (33), wherein the metric relates to a degree of overexposure in the set of images.

(35) The method of (29), wherein determining stereo correspondence between the set of images and the second set of images comprises excluding a temporal pixel from the set of images and/or the second set of images that does not include a minimum number of valid pixel values in a set of pixel values of the temporal pixel.

(36) The method of (29), wherein determining stereo correspondence between the set of images and the second set of images comprises excluding a temporal pixel from the set of images and/or the second set of images that has more than a threshold number of temporal pixels spatially proximate to the temporal pixel, each of which does not include a minimum number of valid pixel values in a set of pixel values of the spatially proximate temporal pixel.

(37) The method of any one of (28) through (36), the method further comprising: obtaining the second set of images of the scene, wherein each image in the second set of images (a) captures a portion of a light pattern projected onto the scene and (b) is of a different perspective of the scene than the perspective of the set of images; generating, based on the second set of images, a second temporal pixel image comprising a second set of temporal pixels, wherein each temporal pixel in the second set of temporal pixels comprises a set of pixel values gathered at an associated second position from each image of the second set of images; generating, for a second temporal pixel from the second set of temporal pixels, second saturation data comprising a second set of saturation values, wherein: each saturation value of the second set of saturation values is associated with a pixel value of the set of pixel values of the second temporal pixel; and each pixel value is compared to the metric to determine a corresponding saturation value.

(38) At least one non-transitory computer-readable storage medium storing processor-executable instructions that, when executed by at least one computer hardware processor, cause the at least one computer hardware processor to perform the acts of: obtaining a set of images of a scene, wherein each image in the set of images (a) captures a portion of a light pattern projected onto the scene and (b) is of a perspective of the scene; generating, based on the set of images, a first temporal pixel image comprising a set of temporal pixels, wherein each temporal pixel in the set of temporal pixels comprises a set of pixel values at an associated position from each image of the set of images; and generating, for a first temporal pixel from the set of temporal pixels, saturation data comprising a set of saturation values, wherein: each saturation value of the set of saturation values is associated with a pixel value of the set of pixel values of the first temporal pixel; and each pixel value is compared to a metric to determine a corresponding saturation value.

(39) A system for determining stereo correspondence between a first set of images and a second set of images, the system comprising a processor in communication with memory, the processor being configured to execute instructions stored in memory that cause the processor to: obtain a first set of images of a scene, wherein each image in the first set of images (a) captures a portion of a light pattern projected onto the scene and (b) is of a perspective of the scene; generate, based on the first set of images, a first temporal pixel image comprising a set of temporal pixels, wherein each temporal pixel in the set of temporal pixels comprises a set of pixel values at an associated position from each image of the first set of images; and determine a set of correspondences between image points of the first set of images and image points of a second set of images of the scene, wherein the second set of images is captured from a different perspective than the first set of images, comprising: determining that a first temporal pixel in the first temporal pixel image is lacking a correspondence to a temporal pixel in a second temporal pixel image determined based on the second set of images; generating, for the first temporal pixel, an approximate correspondence to a second temporal pixel in the second temporal pixel image, based on one or more existing correspondences, wherein each existing correspondence of the one or more existing correspondences: is between a temporal pixel in the first temporal pixel image and a temporal pixel in the second temporal pixel image; and satisfies a relation metric with respect to the first temporal pixel.

(40) The system of (39), wherein the one or more existing correspondences relate to temporal pixels in the first temporal pixel image that are spatially proximate to the first temporal pixel, and wherein the relation metric relates to a degree of spatial proximity to the first temporal pixel.

(41) The system of (39) or (40), wherein the instructions further cause the processor to verify the approximate correspondence based on spatial information, temporal information, or both, relating to the first temporal pixel, the second temporal pixel, or both.

(42) The system of (41), wherein verifying the approximate correspondence based on the temporal information relating to the first temporal pixel, the second temporal pixel, or both, comprises determining whether one or more pixel values in the first temporal pixel, the second temporal pixel, or both, are overexposed.

(43) The system of (41), wherein verifying the approximate correspondence based on the spatial information relating to the first temporal pixel, the second temporal pixel, or both, comprises determining whether one or more temporal pixels spatially proximate to the first temporal pixel share a property with one or more temporal pixels spatially proximate to the second temporal pixel.

(44) The system of (43), wherein the shared property includes a color, a temperature, and/or a texture.

(45) The system of any one of (39) through (44), wherein the processor is further configured to perform the acts of:
  obtain the second set of images of the scene, wherein each image in the second set of images (a) captures a portion of a light pattern projected onto the scene and (b) is of a different perspective of the scene than the perspective of the set of images; and
  generate, based on the second set of images, the second temporal pixel image comprising a second set of temporal pixels, wherein each temporal pixel in the second set of temporal pixels comprises a set of pixel values gathered at an associated second position from each image of the second set of images.

(46) A computerized method for determining stereo correspondence between a first set of images and a second set of images, the method comprising:
  obtaining a first set of images of a scene, wherein each image in the first set of images (a) captures a portion of a light pattern projected onto the scene and (b) is of a perspective of the scene;
  generating, based on the first set of images, a first temporal pixel image comprising a set of temporal pixels, wherein each temporal pixel in the set of temporal pixels comprises a set of pixel values at an associated position from each image of the first set of images; and
  determining a set of correspondences between image points of the first set of images and image points of a second set of images of the scene, wherein the second set of images is captured from a different perspective than the first set of images, comprising:
    determining that a first temporal pixel in the first temporal pixel image is lacking a correspondence to a temporal pixel in a second temporal pixel image determined based on the second set of images;
    generating, for the first temporal pixel, an approximate correspondence to a second temporal pixel in the second temporal pixel image, based on one or more existing correspondences, wherein each existing correspondence of the one or more existing correspondences:
      is between a temporal pixel in the first temporal pixel image and a temporal pixel in the second temporal pixel image; and
      satisfies a relation metric with respect to the first temporal pixel.

(47) The method of (46), wherein the one or more existing correspondences relate to temporal pixels in the first temporal pixel image that are spatially proximate to the first temporal pixel, and wherein the relation metric relates to a degree of spatial proximity to the first temporal pixel.

(48) The method of (46) or (47), wherein the instructions further cause the processor to verify the approximate correspondence based on spatial information, temporal information, or both, relating to the first temporal pixel, the second temporal pixel, or both.

(49) The method of (48), wherein verifying the approximate correspondence based on the temporal information relating to the first temporal pixel, the second temporal pixel, or both, comprises determining whether one or more pixel values in the first temporal pixel, the second temporal pixel, or both, are overexposed.

(50) The method of (48), wherein verifying the approximate correspondence based on the spatial information relating to the first temporal pixel, the second temporal pixel, or both, comprises determining whether one or more temporal pixels spatially proximate to the first temporal pixel share a property with one or more temporal pixels spatially proximate to the second temporal pixel.

(51) The method of (50), wherein the shared property includes a color, a temperature, and/or a texture.

(52) The method of any one of (46) through (51), wherein the method further comprises:
  obtaining the second set of images of the scene, wherein each image in the second set of images (a) captures a portion of a light pattern projected onto the scene and (b) is of a different perspective of the scene than the perspective of the set of images; and
  generating, based on the second set of images, the second temporal pixel image comprising a second set of temporal pixels, wherein each temporal pixel in the second set of temporal pixels comprises a set of pixel values gathered at an associated second position from each image of the second set of images.

(53) At least one non-transitory computer-readable storage medium storing processor-executable instructions that, when executed by at least one computer hardware processor, cause the at least one computer hardware processor to perform the acts of:
  obtaining a first set of images of a scene, wherein each image in the first set of images (a) captures a portion of a light pattern projected onto the scene and (b) is of a perspective of the scene;
  generating, based on the first set of images, a first temporal pixel image comprising a set of temporal pixels, wherein each temporal pixel in the set of temporal pixels comprises a set of pixel values at an associated position from each image of the first set of images; and
  determining a set of correspondences between image points of the first set of images and image points of a second set of images of the scene, wherein the second set of images is captured from a different perspective than the first set of images, comprising:
    determining that a first temporal pixel in the first temporal pixel image is lacking a correspondence to a temporal pixel in a second temporal pixel image determined based on the second set of images;
    generating, for the first temporal pixel, an approximate correspondence to a second temporal pixel in the second temporal pixel image, based on one or more existing correspondences, wherein each existing correspondence of the one or more existing correspondences:
      is between a temporal pixel in the first temporal pixel image and a temporal pixel in the second temporal pixel image; and
      satisfies a relation metric with respect to the first temporal pixel.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

The invention claimed is:

1. A system for pre-processing a temporal pixel image, the system comprising a processor in communication with memory, the processor being configured to execute instructions stored in memory that cause the processor to:
   obtain a set of images of a scene, wherein each image in the set of images (a) captures a portion of a light pattern projected onto the scene and (b) is of a perspective of the scene;
   generate, based on the set of images, a first temporal pixel image comprising a set of temporal pixels, wherein each temporal pixel in the set of temporal pixels comprises a set of pixel values at an associated position from each image of the set of images; and
   generate, based on the first temporal pixel image, a first modified temporal pixel image, comprising modifying a first temporal pixel from the set of temporal pixels, comprising:
      comparing the first temporal pixel to a metric; and
      based on the comparison, replacing one or more pixel values of the first temporal pixel with another value determined based on the first temporal pixel and/or one or more temporal pixels spatially proximate to the first temporal pixel.

2. The system of claim 1, wherein the instructions further cause the processor to:
   determine a stereo correspondence between the set of images and a second set of images, wherein the second set of images is captured from a different perspective than the perspective of the set of images, based on the first modified temporal pixel image and a second modified temporal pixel image determined based on the second set of images.

3. The system of claim 1, wherein the metric relates to a degree of underexposure in the set of images.

4. The system of claim 1, wherein comparing the first temporal pixel to the metric comprises comparing whether a maximum of pixel values in the first temporal pixel is below the metric.

5. The system of claim 4, wherein replacing one or more pixel values of the first temporal pixel with another value determined based on the first temporal pixel and/or one or more temporal pixels spatially proximate to the first temporal pixel comprises replacing each pixel value in the first temporal pixel with a pixel value derived from a Gaussian smoothing of the first temporal pixel and/or the one or more temporal pixels in a spatial neighborhood of the first temporal pixel.

6. The system of claim 1, wherein comparing the first temporal pixel to the metric comprises comparing whether each pixel value in the first temporal pixel is below the metric.

7. The system of claim 6, wherein replacing one or more pixel values of the first temporal pixel with another value determined based on the first temporal pixel and/or one or more temporal pixels spatially proximate to the first temporal pixel comprises replacing each pixel value in the first temporal pixel that is below the metric with a pixel value derived from a Gaussian smoothing of the first temporal pixel and/or the one or more temporal pixels in a spatial neighborhood of the first temporal pixel.

8. The system of claim 1, wherein the instructions further cause the processor to:
   obtain a second set of images of the scene, wherein each image in the second set of images (a) captures a portion of the light pattern projected onto the scene and (b) is of a different perspective of the scene than the perspective of the set of images;
   generate, based on the second set of images, a second temporal pixel image comprising a second set of temporal pixels, wherein each temporal pixel in the second set of temporal pixels comprises a second set of pixel values gathered at an associated second position from each image of the second set of images; and
   generate, based on the second temporal pixel image, a second modified temporal pixel image, comprising modifying a second temporal pixel from the second set of temporal pixels, comprising:
      comparing the second temporal pixel to the metric; and
      based on the comparison, replacing one or more pixel values of the second temporal pixel with another value determined based on the second temporal pixel and/or one or more temporal pixels spatially proximate to the second temporal pixel.

9. A computerized method for pre-processing a temporal pixel image, the method comprising:
   obtaining a set of images of a scene, wherein each image in the set of images (a) captures a portion of a light pattern projected onto the scene and (b) is of a perspective of the scene;
   generating, based on the set of images, a first temporal pixel image comprising a set of temporal pixels, wherein each temporal pixel in the set of temporal pixels comprises a set of pixel values at an associated position from each image of the set of images; and
   generating, based on the first temporal pixel image, a first modified temporal pixel image, comprising modifying a first temporal pixel from the set of temporal pixels, comprising:
      comparing the first temporal pixel to a metric; and
      based on the comparison, replacing one or more pixel values of the first temporal pixel with another value determined based on the first temporal pixel and/or one or more temporal pixels spatially proximate to the first temporal pixel.

10. The method of claim 9, the method further comprising:
   determine a stereo correspondence between the set of images and a second set of images, wherein the second set of images is captured from a different perspective than the perspective of the set of images, based on the first modified temporal pixel image and a second modified temporal pixel image determined based on the second set of images.

11. The method of claim 9, wherein the metric relates to a degree of underexposure in the set of images.

12. The method of claim 9, wherein comparing the first temporal pixel to the metric comprises comparing whether a maximum of pixel values in the first temporal pixel is below the metric.

13. The method of claim 12, wherein replacing one or more pixel values of the first temporal pixel with another value determined based on the first temporal pixel and/or one or more temporal pixels spatially proximate to the first temporal pixel comprises replacing each pixel value in the first temporal pixel with a pixel value derived from a Gaussian smoothing of the first temporal pixel and/or the one or more temporal pixels in a spatial neighborhood of the first temporal pixel.

14. The method of claim 9, wherein comparing the first temporal pixel to the metric comprises comparing whether each pixel value in the first temporal pixel is below the metric.

15. The method of claim 14, wherein replacing one or more pixel values of the first temporal pixel with another value determined based on the first temporal pixel and/or one or more temporal pixels spatially proximate to the first temporal pixel comprises replacing each pixel value in the first temporal pixel that is below the metric with a pixel value derived from a Gaussian smoothing of the first temporal pixel and/or the one or more temporal pixels in a spatial neighborhood of the first temporal pixel.

16. The method of claim 9, the method further comprising:

obtaining a second set of images of the scene, wherein each image in the second set of images (a) captures a portion of the light pattern projected onto the scene and (b) is of a different perspective of the scene than the perspective of the set of images;

generating, based on the second set of images, a second temporal pixel image comprising a second set of temporal pixels, wherein each temporal pixel in the second set of temporal pixels comprises a second set of pixel values gathered at an associated second position from each image of the second set of images; and generating, based on the second temporal pixel image, a second modified temporal pixel image, comprising modifying a second temporal pixel from the second set of temporal pixels, comprising:

comparing the second temporal pixel to the metric; and based on the comparison, replacing one or more pixel values of the second temporal pixel with another value determined based on the second temporal pixel and/or one or more temporal pixels spatially proximate to the second temporal pixel.

17. At least one non-transitory computer-readable storage medium storing processor-executable instructions that, when executed by at least one computer hardware processor, cause the at least one computer hardware processor to perform the acts of:

obtaining a set of images of a scene, wherein each image in the set of images (a) captures a portion of a light pattern projected onto the scene and (b) is of a perspective of the scene;

generating, based on the set of images, a first temporal pixel image comprising a set of temporal pixels, wherein each temporal pixel in the set of temporal pixels comprises a set of pixel values at an associated position from each image of the set of images; and generating, based on the first temporal pixel image, a first modified temporal pixel image, comprising modifying a first temporal pixel from the set of temporal pixels, comprising:

comparing the first temporal pixel to a metric; and based on the comparison, replacing one or more pixel values of the first temporal pixel with another value determined based on the first temporal pixel and/or one or more temporal pixels spatially proximate to the first temporal pixel.

* * * * *